(12) United States Patent
Pinnell et al.

(10) Patent No.: US 10,141,605 B2
(45) Date of Patent: Nov. 27, 2018

(54) ELECTROLYTE FORMULATION FOR REDUCED GASSING WIDE TEMPERATURE RANGE CYCLING

(71) Applicant: A123 Systems, LLC, Waltham, MA (US)

(72) Inventors: Leslie J. Pinnell, Framingham, MA (US); Christopher Campion, Townsend, MA (US); Antoni S. Gozdz, Acton, MA (US); Jeong Ju Cho, Lexington, MA (US)

(73) Assignee: A123 Systems, LLC, Waltham, MA (US)

( * ) Notice: Subject to any disclaimer, the term of this patent is extended or adjusted under 35 U.S.C. 154(b) by 333 days.

(21) Appl. No.: 14/536,522

(22) Filed: Nov. 7, 2014

(65) Prior Publication Data

US 2015/0064549 A1 Mar. 5, 2015

Related U.S. Application Data

(63) Continuation-in-part of application No. PCT/US2013/045513, filed on Jun. 12, 2013.
(Continued)

(51) Int. Cl.
*H01M 10/056* (2010.01)
*H01M 10/0567* (2010.01)
(Continued)

(52) U.S. Cl.
CPC ..... *H01M 10/0567* (2013.01); *H01M 2/0202* (2013.01); *H01M 4/131* (2013.01); *H01M 4/133* (2013.01); *H01M 4/134* (2013.01); *H01M 4/583* (2013.01); *H01M 4/587* (2013.01); *H01M 4/5825* (2013.01); *H01M 10/056* (2013.01); *H01M 10/0525* (2013.01); *H01M 10/0568* (2013.01); *H01M 10/0569* (2013.01); *H01M 4/364* (2013.01); *H01M 4/386* (2013.01);
(Continued)

(58) Field of Classification Search
CPC .. H01M 10/0567; H01M 10/056; H01M 2/02; H01M 4/131; H01M 4/133; H01M 4/134; H01M 2/0202; H01M 4/5825; H01M 4/587; H01M 10/0525; H01M 10/0568; H01M 10/0569; H01M 4/583
See application file for complete search history.

(56) References Cited

U.S. PATENT DOCUMENTS 5,626,981 A 5/1997 Simon et al.
7,338,734 B2 3/2008 Chiang et al.
(Continued)

OTHER PUBLICATIONS

Supplementary Material nomenclature.*
(Continued)

*Primary Examiner* — Alexander Usyatinsky
(74) *Attorney, Agent, or Firm* — McCoy Russell LLP

(57) ABSTRACT

A rechargeable battery cell having a specific combination of anode, cathode and electrolyte formulation is provided. The electrolyte formulation includes an additive system and a salt system. The additive system includes a first additive containing a sulfonyl group, an anti-gassing agent, and a second additive. The salt system includes a lithium salt and a co-salt. The disclosed electrolyte formulation has reduced gassing and improved performance over a wide temperature range.

17 Claims, 13 Drawing Sheets

Related U.S. Application Data

(60) Provisional application No. 61/658,704, filed on Jun. 12, 2012, provisional application No. 61/658,712, filed on Jun. 12, 2012.

(51) Int. Cl.
| | | |
|---|---|---|
| *H01M 4/58* | (2010.01) | |
| *H01M 4/587* | (2010.01) | |
| *H01M 10/0525* | (2010.01) | |
| *H01M 10/0568* | (2010.01) | |
| *H01M 10/0569* | (2010.01) | |
| *H01M 2/02* | (2006.01) | |
| *H01M 4/131* | (2010.01) | |
| *H01M 4/133* | (2010.01) | |
| *H01M 4/134* | (2010.01) | |
| *H01M 4/583* | (2010.01) | |
| *H01M 4/36* | (2006.01) | |
| *H01M 4/38* | (2006.01) | |
| *H01M 4/48* | (2010.01) | |
| *H01M 10/42* | (2006.01) | |

(52) U.S. Cl.
CPC .... *H01M 4/483* (2013.01); *H01M 2010/4271* (2013.01); *H01M 2300/0028* (2013.01); *H01M 2300/0037* (2013.01)

(56) References Cited

U.S. PATENT DOCUMENTS

| | | | |
|---|---|---|---|
| 7,348,101 B2 | 3/2008 | Gozdz et al. | |
| 2004/0002003 A1* | 1/2004 | Yamada | C01B 25/45 429/221 |
| 2004/0197667 A1* | 10/2004 | Noh | H01M 10/0525 429/326 |
| 2005/0233219 A1 | 10/2005 | Gozdz et al. | |
| 2006/0127753 A1* | 6/2006 | Nakashima | H01M 2/1653 429/142 |
| 2008/0193852 A1* | 8/2008 | Murai | H01M 10/0525 429/326 |
| 2009/0123813 A1 | 5/2009 | Chiang et al. | |
| 2009/0142663 A1* | 6/2009 | Takeuchi | H01M 10/0567 429/188 |
| 2009/0170006 A1* | 7/2009 | Abe | H01M 10/0525 429/326 |
| 2009/0325065 A1* | 12/2009 | Fujii | H01M 4/04 429/199 |
| 2012/0219854 A1 | 8/2012 | Nakagawa et al. | |
| 2013/0101874 A1 | 4/2013 | Pevear | |

OTHER PUBLICATIONS

United States Patent and Trademark Office, International Search Report of PCT/US2013/045513, dated Nov. 29, 2013, WIPO, 3 pages.

Abe, K. et al., "Additives-Containing Functional Electrolytes for Suppressing Electrolyte Decomposition in Lithium-Ion Batteries," Electrochimica Acta, vol. 49, No. 26, Oct. 15, 2004, Available Online Jun. 25, 2004, 10 pages.

Petibon, R. et al., "Comparative Study of Electrolyte Additives Using Electrochemical Impedance Spectroscopy on Symmetric Cells," Journal of Power Sources, vol. 251, Apr. 1, 2014, Available Online Nov. 28, 2013, 8 pages.

Klett, M. et al., "Non-Uniform Aging of Cycled Commercial LiFePO4//Graphite Cylindrical Cells Revealed by Post-Mortem Analysis," Journal of Power Sources, vol. 257, Jul. 1, 2014, Available Online Feb. 1, 2014, 47 pages.

* cited by examiner

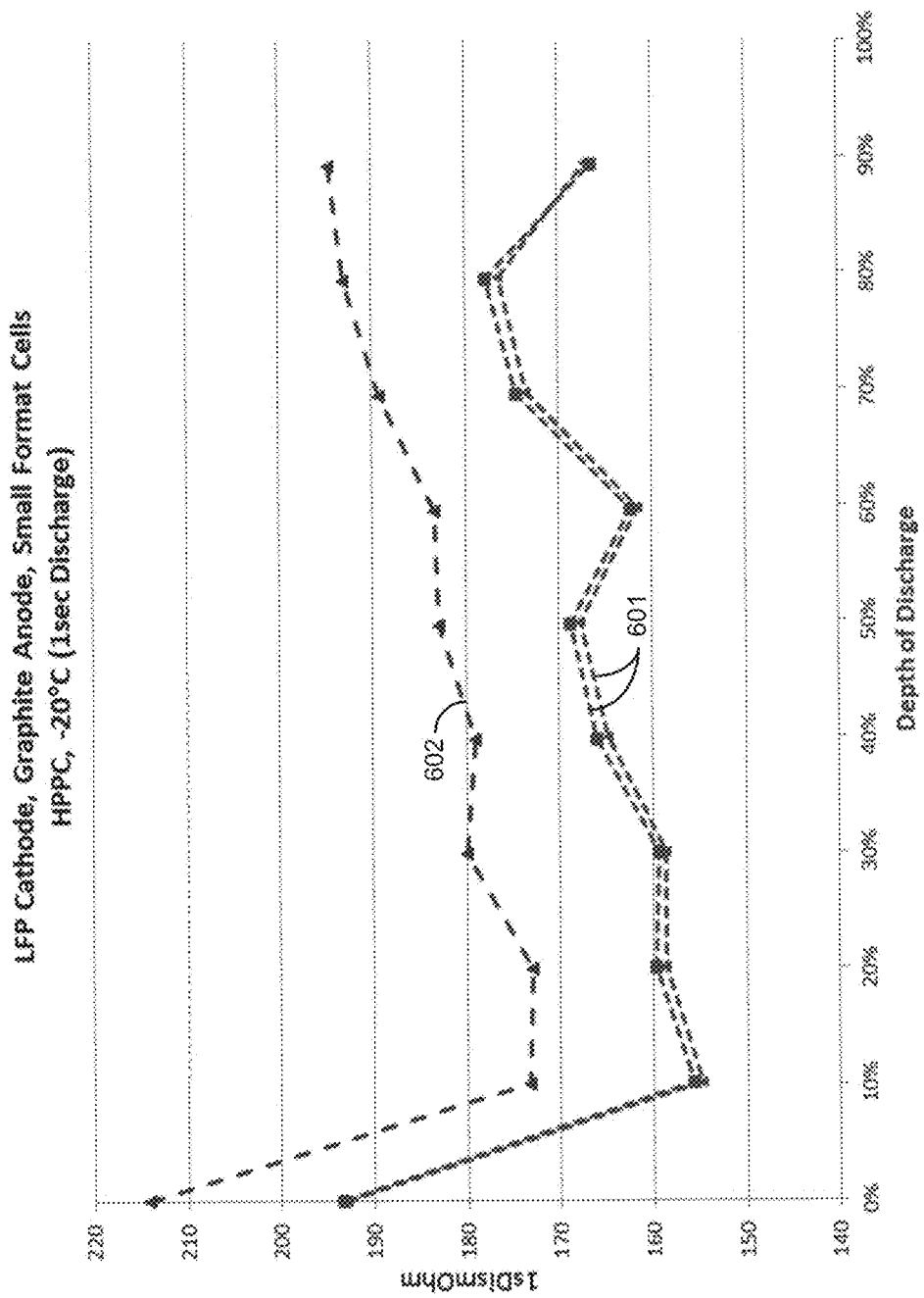

ELECTROLYTE FORMULATION FOR REDUCED GASSING WIDE TEMPERATURE RANGE CYCLING

CROSS-REFERENCE TO RELATED APPLICATIONS

This application is a continuation-in-part of International Patent Application No. PCT/US2013/045513, entitled "Non-Aqueous Electrolytic Rechargeable Batteries for Extended Temperature Range Operation," filed Jun. 12, 2013, which claims priority to U.S. Provisional Application No. 61/658,712, entitled "Microhybrid Battery," filed Jun. 12, 2012, and claims priority to U.S. Provisional Application No. 61/658,704, entitled "Lithium Ion Cell with Non-Aqueous Electrolyte with A Solvent Including an S—O Bond," filed Jun. 12, 2012, the entire contents of each of which are hereby incorporated by reference in their entirety for all purposes.

TECHNICAL FIELD

This disclosure relates to an electrolyte formulation comprising at least one first additive containing a sulfonyl group, a specific salt system, and an anti-gassing additive within specific ratios for use in a rechargeable battery.

BACKGROUND AND SUMMARY

Rechargeable batteries produce energy from electrochemical reactions. In typical rechargeable batteries, the battery is designed to deliver optimal performance at or close to room temperature. Extreme high or low temperatures may compromise the performance and/or life of the battery. In order to address the performance issues at extreme temperatures, batteries may integrate heating and/or cooling systems, which adds volume, weight, complexity and cost. In many cases, this may limit the use of batteries for applications in extreme temperature environments.

Recently, rechargeable batteries have been designed with cells having a specific combination of anode, cathode, and electrolyte compositions to maintain long cycle life at high temperatures while also delivering power at low temperatures. For example, Cho, in WO 2013/188594, incorporated herein by reference for all purposes, discloses an electrolyte formulation comprising a first additive containing a sulfonyl group for use in rechargeable batteries. As disclosed by Cho, the use of additives containing sulfonyl groups in the electrolyte may provide a battery which maintains cycle life at high temperatures and delivers power at low temperatures, significantly reducing the need for thermal management systems.

Cho specifically discloses a rechargeable battery comprising a nonaqueous electrolyte solution comprising a lithium salt, $LiPF_6$, at 0.6-2 M and an organic solvent mixture which includes 35 vol. % ethylene carbonate, 5 vol. % propylene carbonate, 50 vol. % ethyl methyl carbonate, and 10 vol. % diethyl carbonate, and at least one additive containing a sulfonyl group, ethylene sulfite, at 0.1-5 wt. % and vinylene carbonate at 0.2-8 vol. %. The electrolyte formulation provided by Cho provides an increase in power for cold cranking an engine as compared to lead acid batteries and maintains long cycle life at high temperatures.

The use of the additive containing the sulfonyl groups in addition to the vinylene carbonate in organic electrolyte provides a stable, lower impedance rechargeable lithium ion battery. The additive containing the sulfonyl group may lower impedance by reacting with the anode to create a stable solid electrolyte interface (SEI) that is more ionically conductive than with an electrolyte without the additive. In addition, the vinylene carbonate may be efficient at passivating the carbon-based anode during initial charging making the SEI less soluble, and thus, may reduce decomposition of the sulfonyl additive.

However, the inventors herein have recognized that an improved electrolyte formulation based on the electrolyte disclosed by Cho may be provided to improve extreme temperature performance and reduce gassing. An electrolyte formulation comprising a first additive containing a sulfonyl group, an anti-gassing agent, a second additive, and a salt system is provided. Further, the formulation includes vinylene carbonate and a solvent system. The electrolyte formulation may be used in various cell constructions, but may be specifically beneficial in a pouch construction due to the reduced gassing.

The disclosed electrolyte formulation may reduce gassing over a wide temperature range during cycling. Further, the ratio between the sulfonyl group additive and vinylene carbonate may be controlled to maintain an improved SEI layer for improved cell cycling efficiency. As provided herein, the optimized electrolyte formulation reduces/maintains impedance and provides improved power during cold crank, while also reducing gassing during high temperature cycling and/or storage.

As provided herein, the first additive containing a sulfonyl group may be 0.1 to 5 weight % of the electrolyte formulation. The anti-gassing agent may be equal to or less than 2 weight % while the second additive may be 0.1-5 weight % of the electrolyte formulation. The additional additive may be chosen to reduce the loading of the vinylene carbonate while still maintaining good SEI development. The salt system may comprise a lithium salt combined with a co-salt, wherein the co-salt is unlikely to generate Lewis acidic decomposition.

It will be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6A illustrates the hybrid pulse power capability (HPPC) at −20° C. of the electrolyte formulation in an LFP/Graphite cell, at 1 second pulse power compared to control electrolytes.

DETAILED DESCRIPTION

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree.

Figure 1:
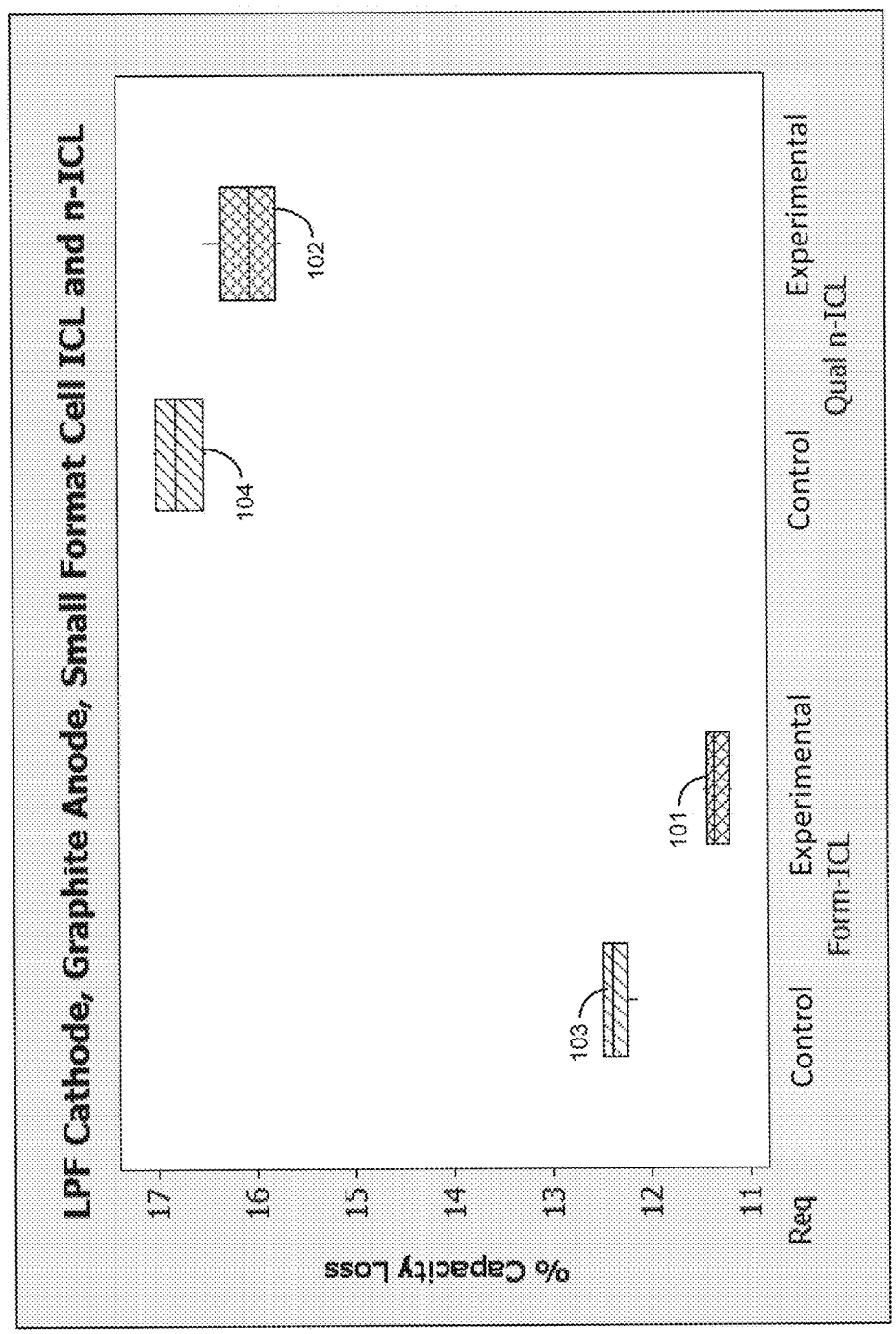
FIG. 1 illustrates the initial capacity loss of the electrolyte formulation in an LFP/Graphite cell compared to control electrolytes.
Figure 2:
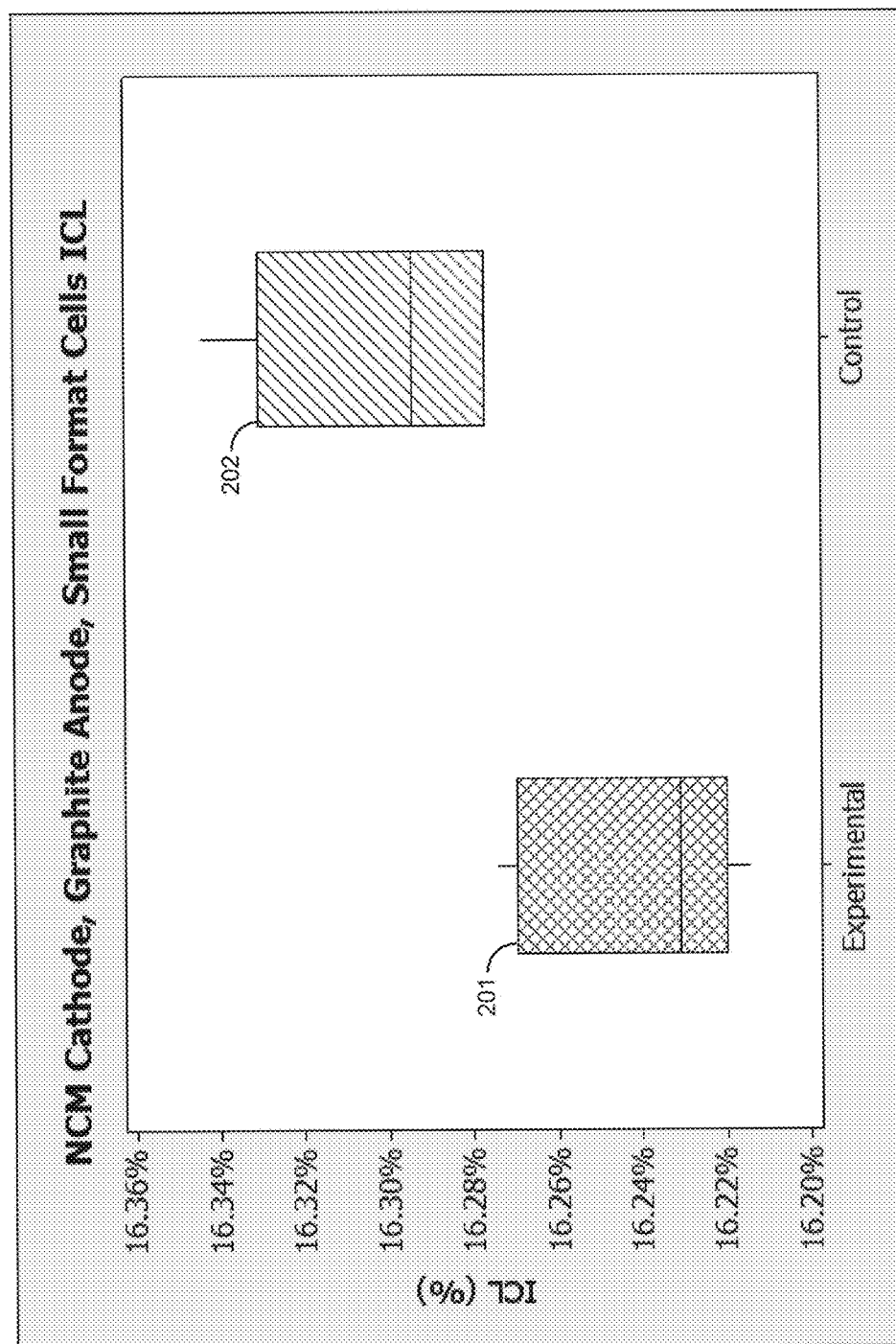
FIG. 2 illustrates the initial capacity loss of the electrolyte formulation in a cell comprising an NCM cathode and graphite anode, compared to control electrolytes.

This disclosure provides an optimized electrolyte formulation which comprises a first additive containing a sulfonyl group, an anti-gassing agent, a second additive to reduce impedance and a salt system. This optimized electrolyte formulation provides an unexpected improvement in initial capacity loss, illustrated in FIGS. 1 and 2, compared to control electrolyte formulations. Further, the optimized electrolyte formulation provides similar and/or reduced direct current and alternating current resistance (DCR, ACR) illustrated in FIGS. 3, 4, 5A, 5B, 6A, and 6B, as compared to control electrolyte formulations. The optimized electrolyte formulation further shows improved cold cranking power, illustrated in FIGS. 7 and 8, and unexpected improvements in cycling over a wide temperature range, illustrated in FIG. 9. Moreover, the specific electrolyte formulation has an unexpected result of reducing impedance while simultaneously reducing gassing, illustrated in FIG. 10. The low gassing of the electrolyte formulation allows for use of the electrolyte formulation in various cell constructions, specifically, a pouch construction, illustrated in FIG. 11

As provided above, the electrolyte formulation provides low gassing at high temperatures while still providing low impedance at very low temperatures and provides good SEI development. Shown in Table 1 are the ranges of the additives and salt system of an example electrolyte formulation according to the current disclosure.

TABLE 1

Electrolyte Formulation

| | RANGE |
|---|---|
| Additive System | |
| First additive containing sulfonyl group | 0.1 to 5 wt. % |
| Vinylene carbonate | 0.1 to 5 wt. % |
| Anti-gassing additive | less than 2 wt. % |
| Second additive | 0.1 to 5 wt. % |
| Salt System | |
| Lithium Salt | 0.1 to 2.0M |
| Co-Salt | 0.05 to 0.25M |

As shown in the above table, the electrolyte formulation may be considered to have an additive system and a salt system. The additive system comprises components each at less than 5 wt. %. The additive system as disclosed includes a first additive containing a sulfonyl group, vinylene carbonate, an anti-gassing additive and a second additive. The combination of the first additive containing a sulfonyl group, the vinylene carbonate, the anti-gassing additive and the second additive reduce impedance and strengthen the SEI layer.

Further, the anti-gassing additive in the disclosed additive system reduces gas generation which may result from reactions of one or more of the other additives, such as the first additive containing a sulfonyl group. The electrolyte additive system is specifically designed to control gas generation and mitigate impedance increase from some additives, such as increased impedance from the anti-gassing and SEI forming additives, by providing a formulation which allows for a lower weight percent of the additive containing a sulfonyl group, a lower weight percent of the SEI forming additive may be used in combination with a salt system.

The disclosed salt system enables a lower amount of LiPF$_6$ to be used, as a co-salt is included. The co-salt is chosen from a group that does not generate Lewis acidic species during decomposition. The inclusion of the co-salt has the unexpected effect of allowing for the use of a lower weight percent of the at least one additive containing a sulfonyl group due to the lower concentration of Lewis acidic products formed from decomposition of LiPF$_6$. The lower weight percent of the at least one additive containing a sulfonyl group further has the unexpected benefit of allowing for a lower amount of an anti-gassing agent to reduce the effect of high impedance generally encountered with anti-gassing agents. This unique formulation results in a cell with low gassing and reduced impedance which is contrary to the use of anti-gassing additives combined with additives containing sulfonyl groups.

In use, the electrolyte formulation provides an improved battery. For example, a rechargeable battery may include an anode (also referred to as a negative electrode), a cathode (also referred to as a positive electrode), a separator, and a nonaqueous electrolyte solution, such as the electrolyte of the current disclosure. The rechargeable batteries comprising cells as disclosed herein have low gassing, maintain long cycle life over a wide temperature range, reduce impedance, and improve power during cold cranking As a further example, the electrolyte formulation may be used in a lithium ion battery.

As provided above, the electrolyte formulation is a non-aqueous electrolytic solution and may include an additive system and a salt system. The additive system may include a first additive containing a sulfonyl group, vinylene carbonate, an anti-gassing additive, and a second additive. In one example, the salt system may include $LiPF_6$ and a co-salt. Further, the solution includes a solvent system.

The at least one first additive containing a sulfonyl group, may reduce the loading of the vinylene carbonate while still maintaining good SEI development. For example, the first additive containing a sulfonyl group, may be represented by the formula (1):

in which, $R_1$ and $R_2$ independently represent an alkyl group which may be substituted with an aryl group or halogen atom; an aryl group with may be substituted with an alkyl group or halogen atom; or may be taken together to form, together with -A-, a cyclic structure which may further contain an unsaturated bond, where "A" is represented by a formula selected from the group comprising:

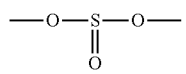 (2)

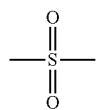 (3)

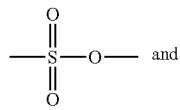 and (4)

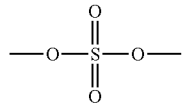 (5)

$R_1$ or $R_2$ may be an alkyl group having 1 to 4 carbon atoms, which may be specifically exemplified as a methyl group, ethyl group, propyl group, isopropyl group, and butyl group. Examples of an aryl group capable of substituting the alkyl group include phenyl group, naphthyl group, and anthranyl group, among these, phenyl group being more preferable. Examples of a halogen atom capable of substituting the alkyl group include fluorine atom, chlorine atom, and bromine atom. A plurality of these substituents may substitute the alkyl group, and a concomitant substitution by an aryl group and halogen group is also allowable.

The cyclic structure formed by $R_1$ and $R_2$ bound with each other and together with -A- is of four-membered or larger ring, and may contain a double bond or triple bond. Examples of bound group formed by $R_1$ and $R_2$ bound with each other include —$CH_2$—, —$CH_2CH_2$—, —$CH_2CH_2CH_2$—, —$CH_2CH_2CH_2CH_2$—, —$CH$=$CH$—, —$CH$=$CHCH_2$—, —$CH_2CH$=$CHCH_2$—, and —$CH_2CH_2C$≡$CCH_2CH_2$—. One or more hydrogen atoms in these groups may be substituted by alkyl group(s), halogen atom(s), aryl group(s), and so forth.

Specific examples of the molecule having "A" as represented by the formula (2) include linear sulfites. For example, dimethyl sulfite, diethyl sulfite, ethyl methyl sulfite, methyl propyl sulfite, ethyl propyl sulfite, diphenyl sulfite, methyl phenyl sulfite, ethyl sulfite, dibenzyl sulfite, benzyl methyl sulfite, and benzyl ethyl sulfite; cyclic sulfites such as ethylene sulfite, propylene sulfite, butylene sulfite, vinylene sulfite, phenylethylene sulfite, 1-methyl-2-phenylethylene sulfite, and 1-ethyl-2-phenylethylene sulfite; and halides of such linear and cyclic sulfites.

Specific examples of the molecule having "A" as represented by the formula (3) include linear sulfones such as dimethyl sulfone, diethyl sulfone, ethyl methyl sulfone, methyl propyl sulfone, ethyl propyl sulfone, diphenyl sulfone, methyl phenyl sulfone, ethyl phenyl sulfone, dibenzyl sulfone, benzyl methyl sulfone and benzyl ethyl sulfone: cyclic sulfones such as sulfolane, 2-methyl sulfolane, 3-methyl sulfolane, 2-ethyl sulfolane, 3-ethyl sulfolane, 2,4-dimethyl sulfolane, sulfolene, 3-methyl sulfolene, 2-phenyl sulfolane and 3-phenyl sulfolane; and halides of such linear and cyclic sulfones.

Specific examples of the molecule having "A" as represented by the formula (4) include linear sulfonic acid esters such as methyl methanesulfonate, ethyl methanesulfonate, propyl methanesulfonate, methyl ethanesulfonate, ethyl ethanesulfonate, propyl ethanesulfonate, methyl benzenesulfonate, ethyl benzenesulfonate, propyl benzenesulfonate, phenyl methanesulfonate, phenyl ethanesulfonate, phenyl propanesulfonate, methyl benzylsulfonate, ethyl benzylsulfonate, propyl benzylsulfonate, benzyl methanesulfonate, benzyl ethanesulfonate and benzyl propanesulfonate; cyclic sulfonic acid esters such as 1,3-propanesultone, 1,4-butanesultone, 3-phenyl-1,3-propanesultone and 4-phenyl-1,4-butanesultone; and halides of such linear and cyclic sulfonic acid esters.

Specific examples of the molecule having "A" as represented by the formula (5) include chain sulfuric acid esters such as dimethyl sulfate, diethyl sulfate, ethyl methyl sulfate, methyl propyl sulfate, ethyl propyl sulfate, methyl phenyl sulfate, ethyl phenyl sulfate, phenyl propyl sulfate, benzyl methyl sulfate and benzyl ethyl sulfate; cyclic sulfuric acid esters such as ethylene glycol sulfuric ester, 1,2-propanediol sulfuric ester, 1,3-propanediol sulfuric ester, 1,2-butanediol sulfuric ester, 1,3-butanediol sulfuric ester, 2,3-butanediol sulfuric ester, phenylethylene glycol sulfuric ester, methylphenylethylene glycol sulfuric ester and ethylphenylethylene glycol sulfuric ester; and halides of such chain and cyclic sulfuric acid esters.

The molecule represented by the formula (1) may be used singly, or two or more of such molecules may be used in combination in the electrolyte formulation.

The first additive containing a sulfonyl group represented by the formula (1) are exemplified as ethylene sulfite, dimethyl sulfite, sulfolane, sulfolene, and sultone.

The amount of the first additive represented by the formula (1) contained in the organic solvent of the nonaqueous electrolyte solution is preferably within a range of 0.05 to 100 vol. %, 0.05 to 60 vol. %, 0.1 to 15 vol %, or 0.5 to 2 vol. %. Alternatively, the first additive is within a range of 0.1 to 5 wt. %, 0.1 to 3 wt. %, or 0.1 to 1 wt. % of the electrolyte formulation. Some of the first additives represented by the formula (1) are solid at room temperature, such molecules preferably being used at an amount equal to or lower than the saturation solubility for the organic solvent used, and more preferably at 60 wt. % of the saturation solubility or lower, and still more preferably at 30 wt. % or lower. Thus, the additive remains dissolved and in solution in the organic solvent over an anticipated use temperature range, such as e.g., between −30° C. and +60° C.

The vinylene carbonate is efficient at passivating the carbon-based anode during initial charging and thus may reduce decomposition of the additive by making the SEI less soluble. The vinylene carbonate may be added at 0.1 to 5 wt. % of the electrolyte formulation. The vinylene carbonate amount may be adjusted such that the ratio between the vinylene carbonate and the additive containing a sulfonyl group (VC:-A-) is optimized to reduce the loading of vinylene carbonate while still maintaining a superior SEI layer for improved cell cycling efficiency. In one example, the ratio between VC:-A-may be 1:1. In another example, the ratio between VC:-A-may be 2:1.5. In yet another example, the ratio between VC:-A-may be 2:1.

Further, in the additive system, the anti-gassing agent may be added to the electrolyte to reduce gas formation during the lifetime of the cell. In some examples, anti-gassing agents may work via a pathway that deactivates catalytic sites in cathode active materials. Although anti-gassing agents typically increase the impedance of the cell, the current disclosed electrolyte formulation provides for an improved and/or maintained impedance level. Specifically, the electrolyte formulation in the current disclosure enables a reduced loading of an anti-gassing agent which coupled with the specific combination of the additive and salt system further reduces cell impedance.

In some example embodiments, the anti-gassing agent may be present at less than 2.0 wt. %, less than 1.5 wt. %, or less than 1.0 wt. % of the electrolyte formulation. For example, the anti-gassing agent may be selected from at least one of 1,5,2,4-dioxadithiane-2,2,3,3-tetraoxide (MMDS), prop-1-ene-1,3-sultone (PrS), or 1,3-propane sultone. In another example, the anti-gassing agent may be at least one or more of 1,5,2,4-dioxadithiane-2,2,3,3-tetraoxide (MMDS), prop-1-ene-1,3-sultone (PrS), or 1,3-propane sultone.

In other examples, other anti-gassing agents may be chosen which reduce gas formation during the lifetime of a cell. In one example, 1,3-propane sultone may be used. The anti-gassing agent may be different from the at least one first additive containing a sulfonyl group and used in addition to the additive containing a sulfonyl group. It may be noted that the anti-gassing agent and additive containing a sulfonyl group may function in different roles within the electrolyte.

Further, as provided above, the additive system may include a second additive. A second additive may be used to reduce the loading of the vinylene carbonate while still maintaining good SEI development for improved cell cycling efficiency. The second additive may be present at less than 5 wt. % of the electrolyte formulation. For example, the second additive may be present from 0.1 to 5.0 wt. %. In one embodiment, more than one second additive may be used to further reduce impedance while maintaining gas suppression and good cycle life over a wide temperature range. In one example, fluoroethylene carbonate (FEC) may be included as the second additive.

In addition to the additive system, the electrolyte formulation includes a salt system. The salt system comprises a lithium salt and a co-salt. Specifically, the salt system used for the nonaqueous electrolytic solution includes a lithium salt combined with a co-salt, wherein the co-salt is unlikely to produce Lewis acidic products as a result of decomposition. The selected salt system maintains the benefits of the lithium salt, for example, $LiPF_6$ salt, by combining the lithium salt with a co-salt that does not demonstrate the drawbacks of $LiPF_6$. By selecting a co-salt in combination with the lithium salt, it is possible to address the strong Lewis acids, such as $PF_5$ and $OPF_3$ originating from decomposition mechanisms of $LiPF_6$.

The lithium salt may be selected to have beneficial properties analogous to those of $LiPF_6$. For example, the lithium salt may be selected from the group comprising $LiPF_6$, $LiClO_4$, $LiBF_4$, $LiCF_3SO_3$, $LiN(CF_3SO_2)_2$, $LiN(CF_3CF_2SO_2)_2$, $LiN(CFSO_2)(C_4F_9SO_2)$, and $LiC(CF_3SO_2)_2$.

The co-salt may be selected from salts having at least one or more of the following properties: a salt which does not readily undergo decomposition; a salt which does not generate Lewis acidic species during decomposition which further reduces gassing via an electrolyte decomposition pathway; a salt which is resistant to protic solvents or protic impurities in the solvent system; a salt which is inherently low-gassing; and a salt which has good conductivity at low temperatures and does not increase impedance in the cell, especially at low temperatures. Further, the selected co-salt may have one or more of the following further properties: high solubility in carbonaceous solvents, good conductivity across a range of temperatures, and not increase impedance. For example, a co-salt may be chosen which does not produce or generate Lewis acidic decomposition products during decomposition. In one example, the co-salt may be chosen which does not produce or generate Lewis acidic decomposition products during thermolysis.

As an example, and not as a limitation, the co-salt may include, for example, imide salts, triflate salts, organo-borate salts and their fluorinated analogs. Examples of imide salts may include bis(trifluoromethane)sulfonamide lithium salt (LiTFSI) and lithium bis pentafluoroethanesulfonyl imide (LiBETI). Examples of triflate salts may include lithium trifluoromethanesulfonate ($LiSO_3CF_3$). Examples of organo-borate salts may include lithium bisoxalatoborate (LiBOB) and their fluorinated analogs such as lithium difluorooxalataoborate (LiFOB).

In one specific embodiment, the salt system may include $LiPF_6$ and a sulfonamide lithium salt. As another, non-limiting specific example, the salt system may include $LiPF_6$ and LiTFSI.

The salt system may include the lithium salt up to 2.0M, or at 0.5M to 1.5M, or 0.5M to 1.0M. The co-salt may be present as a fraction of the entire molar loading of the salts in the salt system. The co-salt may be present up to 0.25M or 0.05M to 0.15M.

In addition to the additive system and salt system, an organic solvent system may be included in the electrolyte formulation. Examples of organic solvents include cyclic carbonates such as ethylene carbonate, propylene carbonate and butylene carbonate; chain carbonates such as dimethyl carbonate, diethyl carbonate and ethyl methyl carbonate; cyclic esters such as γ-valerolactone; chain esters such as methyl acetate and methyl propionate; cyclic ethers such as tetrahydrofuran, 2-methyl tetrahydrofuran and tetrahydropyran; chain ethers such as dimethoxyethane and dimethoxymethane; cyclic phosphoric acid esters such as ethylene methyl phosphate and ethyl ethylene phosphate; chain phosphoric acid esters such as trimethyl phosphate and triethy phosphate; halides thereof; sulfur-containing organic solvents other than those represented by the formula (1) and by vinyl ethylene carbonate (VEC) and fluoroethylenecarbonate (FEC), poly(ethylene glycol)diacrylate. These organic solvents may be used singly, or two or more of such solvents may be used in combination.

In one exemplary example, the electrolyte formulation may comprise a co-salt containing $LiPF_6$ and LiTFSI, a solvent system including ethylene carbonate (EC), ethyl methyl carbonate (EMC), diethyl carbonate (DEC), and propylene carbonate (PC), ethylene sulfite (ES) present as the additive containing a sulfonyl group, vinylene carbonate (VC) and fluoroethylene carbonate (FEC) as the additional additive, and 1,3-propane sultone (PS) as an anti-gassing agent.

The rechargeable battery contains a positive electrode. In some examples, the positive electrochemically active material may be a lithium metal oxide. For example, lithium cobalt oxide, $LiCoO_2$, may be used as the positive electrochemically active material. In some other examples, the positive electrochemically active material may be a lithium transition metal oxoanion material selected from the group:

(a) a formulation $Li_x(M'_{1-a}M''_a)_y(XO_4)_z$, $Li_x(M'_{1-a}M''_a)_y(OXO_4)_z$ or $Li_x(M'_{1-a}M''_a)_y(X_2O_7)_z$, having a conductivity at 27° C. of at least about $10^{-8}$ S/cm, wherein M' is a first row transition metal, X is at least one of phosphorus, sulfur, arsenic, boron, aluminum, silicon, vanadium, molybdenum and tungsten, M" is one or more Group IIA, IIIA, IVA, VA, VIA, VIIA, VIIIA, IB, IIB, IIIB, IVB, VB, and VIB metal, $0.0001 < a \leq 0.1$ and x, y, and z are greater than 0 and have values such that x, plus y(1−a) times the formal valence or valences of M' plus ya times the formal valence or valences of M" is equal to z times the formal valence of the $XO_4$, $X_2O_7$, or $OXO_4$ group;

(b) a formulation $(Li_{1-a}M''_a)_xM'_y(XO_4)_z$, $(Li_{1-a}M''_a)_xM'_y(OXO_4)_z$, or $(Li_{1-a}M''_a)_xM'_y(X_2O_7)_z$, having a conductivity at 27° C. of at least about $10^{-8}$ S/cm, wherein M' is a first row transition metal, X is at least one of phosphorus, sulfur, arsenic, boron, aluminum, silicon, vanadium, molybdenum and tungsten, M" is one or more Group IIA, IIIA, IVA, VA, VIA, VIIA, VIIIA, IB, IIB, IIIB, IVB, VB, and VIB metal, $0.0001 < a \leq 0.1$ and x, y, and z are greater than 0 and have values such that x, plus y(1−a) times the formal valence or valences of M' plus ya times the formal valence or valences of M" is equal to z times the formal valence of the $XO_4$, $X_2O_7$, or $OXO_4$ group;

(c) a formulation $(Li_{b-a})M''_a)_xM'_y(XO_4)_z$, $(Li_{b-a})M''_a)_xM'_y(OXO_4)_z$, or $(Li_{b-a})M''_a)_xM'_y(X_2O_7)_z$, having a conductivity at 27° C. of at least about $10^{-8}$ S/cm, wherein M' is a first row transition metal, X is at least one of phosphorus, sulfur, arsenic, boron, aluminum, silicon, vanadium, molybdenum and tungsten, M" is one or more Group IIA, IIIA, IVA, VA, VIA, VIIA, VIIIA, IB, IIB, IIIB, IVB, VB, and VIB metal, $0.0001 < a \leq 0.1$, $a \leq b \leq 1$, and x, y, and z are greater than 0 and have values such that (b−a)x, plus y(1−a) times the formal valence or valences of M' plus ya times the formal valence or valences of M" is equal to z times the formal valence of the $XO_4$, $X_2O_7$, or $OXO_4$ group.

In other examples, the cathode active material is a lithium transition metal phosphate compound having the formula $(Li_{1-x}Z_x)MPO_4$, where M is one or more of vanadium, chromium, manganese, iron, cobalt, and nickel, Z is one or more of titanium, zirconium, niobium, aluminum, tantalum, tungsten or magnesium, and x ranges from 0 to 0.05 or $Li_{1-x}MPO_4$, wherein M is selected from the group comprising vanadium, chromium, manganese, iron, cobalt, and nickel; and $0 \leq x \leq 1$.

In yet another example, the positive electrochemically active material is a lithium metal phosphate, for example, lithium iron phosphate. The positive electrochemically active material may be present as powder or particulates with a specific surface area of greater than 5 $m^2/g$, 10 $m^2/g$, or greater than 15 $m^2/g$, or greater than 20 $m^2/g$, or even greater than 30 $m^2/g$.

For example, the cathode may comprise a lithium metal phosphate. In one example, the lithium metal phosphate may be lithium iron phosphate, $LiFePO_4$. Further, the $LiFePO_4$ may have an olivine structure and be made in the form of very small, high specific surface area particles which are exceptionally stable in their delithiated form even at elevated temperatures and in the presence of oxidizable organic solvents, e.g., electrolytes, thus enabling a safer Li-ion battery having a very high charge and discharge rate capability, but it also exhibits excellent retention of its lithium intercalation and deintercalation capacity during many hundreds, or even thousands of high-rate cycles.

The rechargeable battery contains a negative electrode capable of intercalating and releasing lithium. For example, the anode may comprise graphite or silicon/graphite electrochemically active materials. In one example, when a graphitic carbonaceous material is used, an artificial graphite made from soft (graphitizable) pitch of various origins processed by annealing, purified natural graphite; or these graphites subjected to a variety of surface processings with, for example, pitch, may be used.

There is no restriction on the method of fabricating the negative or positive electrode using the aforementioned active materials. In one example, the electroactive material is mixed with a binder, a conductive material, solvent, etc. to prepare a slurry wherein the slurry is then coated on a substrate of a current collector, which is followed by drying to produce the electrode. Further, such electrode materials may be subjected to roll forming or compression molding to be fabricated into a sheet or pellet, respectively.

The types of binders used for the fabrication of the electrodes are not particularly limited as far as it is stable to the solvent and electrolytic solution used in the fabrication of the electrode. Examples of the binder include resinous polymers such as polyethylene, polypropylene, polyethylene terephthalate, aromatic polyamide, and cellulose; rubbery polymers such as styrene-butadiene rubber, isoprene rubber, butadiene rubber, and ethylene-propylene rubber; thermoplastic elastomeric polymers such as styrene-butadiene-styrene block copolymer and its hydrogenated product, styrene-ethylene-styrene block copolymer and its hydrogenated product; flexible resinous polymers such as syndiotactic 1,2-polybutadiene, ethylene-vinyl acetate copolymer, and propylene-α-olefin (having 2 to 12 carbon atoms) copolymer; and fluorocarbon polymers such a polyvinylidene fluoride, polytetrafluoroethylene, and polytetrafluoroethylene-ethylene copolymer.

As the binder, one may also use a polymer formulation having an alkali metal ion (in particular a lithium ion) conductivity. As such ion conductive polymer formulations, these may be used in a composite system made of polymeric compound as combined with lithium salt or with an alkali metal salt.

The negative electrode material and the binder may be mixed in various manners. For example, particles of both may be mixed or particles of the negative electrode material may be entangled with fibrous binder to create a mixture, or a layer of the binder may be deposited on the surface of the negative electrode particles. In one example, the mixing ratio of the binder to the negative electrode material may be 0.1 to 30 wt. % of the negative electrode material. In another example, the mixing ratio of the binder to the negative electrode material may be 0.5 to 10 wt. % of the negative electrode material. Addition of the binder in amounts exceeding 30 wt. % may raise the internal resistance of the electrode and amounts below 0.1 wt. % may weaken the adhesive strength between the current collector and the negative electrode material.

In mixing the negative electrode material and the binder, a conductive material may be mixed jointly. Since the conductive material used is not restricted in type, the conductive material may be a metal or a nonmetal. For example, a metallic conductive material may be composed of metallic elements such as Cu or Ni. In another example, a nonmetallic conductive material may be carbon materials such as graphite, carbon black, acetylene black, and Ketjen black. The mean particle diameter of the conductive material may be 1 µm or less.

In one example, a mixing ratio of the conductive material may be 0.1 to 30 wt. % of the negative electrode material. In another example, the mixing ratio of the conductive material may be 0.5 to 15 wt. % of the negative electrode material. A mixing ratio of the conductive additive at greater than 0.1 wt. % may provide a sufficiently formed conduction path between the conductive materials within the electrode.

The above-mentioned mixture containing at least the negative electrode material and binder may be applied to a current collector foil. The application of the mixture to the current collector may be performed by means known to those skilled in the art. For example, when the mixture is a slurry, the slurry may be applied onto the current collector by roller coating. In another example, when the mixture contains a solvent, the solvent may be dried to remove the solvent, whereby an electrode may be prepared.

The positive electrode containing the positive electroactive material has a specific surface area of the electrode measured using the nitrogen adsorption Brunauer-Emmet-Teller (BET) method after the densification or calendaring step that is greater than 5 $m^2/g$. A positive electrode may have a thickness of less than 125 µm, e.g., between about 50 µm to 125 µm, or between about 80 µm to 100 µm on each side of the current collector, and a pore volume fraction between about 40 and 70 vol. %. The active material is typically loaded at about 10-20 $mg/cm^{23}$, and typically about 11-15 $mg/cm^2$.

The negative active material may consist of powder or particulates with a specific surface area measured using the nitrogen adsorption Brunauer-Emmet-Teller (BET) method to be greater than about 2 $m^2/g$, or 4 $m^2/g$, or even about 6 $m^2/g$. The negative electrode may have a thickness of less than 75 µm, for example, between about 20 µm to 65 µm, or between about 40 µm to 55 µm on both sides of the current collector, and a pore volume fraction between about 20 and 40 vol. %. The active material may typically be loaded at about 5-20 $mg/cm^2$, or about 4-5 $mg/cm^2$.

It may be noted that there are no particular restrictions on the fabrication process of the positive electrode, and a similar method for a negative as described above may be employed.

It may be noted that there are no specific limitations on the source material or morphology of the separator used for the cell of the present disclosure. The separator serves to separate the negative electrode and the positive electrode so as to avoid their physical contact. In one example, a separator may have high ion permeability and a low electrical resistance. Materials for the separator may preferably be selected from those excellent in stability against the electrolytic solution and in liquid holding properties. For example, nonwoven fabric or porous film made of polyolefins, such as polyethylene and polypropylene, may be used as the separator, into which the electrolytic solution is impregnated.

Methods for fabricating the nonaqueous electrolytic solution cell using such nonaqueous electrolytic solution, negative electrode, positive electrode, outer container, and separator, is of no specific limitation, and may be selected from those generally employed. The nonaqueous electrolytic cell of the present disclosure may further comprise a gasket, a sealing plate, and a cell case besides such nonaqueous electrolytic solution, negative electrode, positive electrode, outer can or pouch material and separator. In one example, the nonaqueous electrolytic solution cell of the present disclosure may be constructed as a pouch due to low gassing of the electrolyte over a wide temperature range.

The battery as described herein demonstrates advantageous properties over a wide temperature range in which the battery may be expected to operate. For example, the battery is capable of operation between −30° C. and +60° C. Further, the battery with the disclosed electrolyte formulation has reduced gassing and lowered impedance. Lowered impedance of the battery is important in both increasing performance at lower temperatures and lengthening battery life. The advantageous and unexpected properties may be achieved via an electrolyte formulation which comprises organic solvents, a first additive containing a sulfonyl group, vinylene carbonate, an anti-gassing agent, a second additive to reduce vinylene carbonate loading, and a salt system wherein a lithium salt is combined with a co-salt, wherein the co-salt is unlikely to generate Lewis acidic decomposition products. The vinylene carbonate amount may be adjusted such that the ratio between the additive containing a sulfonyl group and the vinylene carbonate is optimized to reduce the loading of vinylene carbonate while still maintaining a superior SEI layer for improved cell cycling efficiency.

In general, a thicker electrode layer (and higher active material loading) provides greater total capacity for the battery. However, thicker layers also increase the electrode impedance. Contrary to conventional practice and in accordance to one or more embodiments, high capacity, thick layers may be used in a low impedance (high rate) cell. Use of a high specific surface area active material, while maintaining adequate pore volume, provides the desired capacity without increasing impedance to unacceptably high levels.

In terms of battery containers, the reduced gassing electrolyte formulation allows for use in pouches, as well as other constructions.

Selection of organic solvents in the electrolyte is also important in reducing impedance. In some embodiments, the electrolyte is advantageously free of γ-butyrolactone as γ-butyrolactone may undergo reductive oxidation at the negative electrode when the battery is charging (see Petibon et al, *Journal of the Electrochemical Society,* 160(1) A117-A124(2013)). The resulting decomposition products may cause clogging of the separator. The clogging may then increase the surface resistance of the negative electrode thus increasing impedance at the anode, leading to significant capacity loss with cycling.

Additionally, the use of the additive as represented by formula (1) in addition to vinylene carbonate (VC) in nonaqueous, organic, electrolytes leads to stable, lower impedance lithium ion batteries. Without being bound by any specific theory, it appears that the additive lowers impedance by reacting with the anode to create a SEI that is more ionically conductive than with an electrolyte without the additive. In addition, VC is efficient at passivation of the carbon-based anode during initial charging. VC prevents the additive from decomposing by making the SEI less soluble.

The SEI originates from the thermodynamic instability of graphite-based anodes in organic electrolytes. The first time a battery is charged, referred to as formation, the graphite reacts with the electrolyte. This forms a porous passivation layer, referred to as a solid electrolyte interface (SEI) that protects the anode from further attacks, moderating the charge rate and restricting the current. This reaction also consumes little lithium. At high temperatures, or when the battery runs all the way down to zero charge ("deep cycling"), the SEI may partially dissolve into the electrolyte. At high temperatures, electrolyte may also decompose and side reactions accelerate, potentially leading to thermal runaway. When temperatures become lower, another protective layer will form, but may consume more lithium, leading to higher capacity losses. Thus, stability of the SEI at high temperatures, one benefit of the battery described herein, is important in increasing the life of the battery. Further, the battery described herein provides reduced gassing over a wide temperature range.

However, if the SEI layer thickens too much, it actually becomes a barrier to the lithium ions, increasing impedance. The thickness of the SEI layer may affect power performance, which is important for electric vehicles.

One way to define cell impedance is to measure area specific impedance. Impedance values can be determined for the total cell or for specific junctions, such as the anode or the cathode. Area specific impedance (ASI) is the impedance of a device normalized with respect to surface area and is defined as the impedance measured at 1 kHz ($\Omega$), using an LCZ meter or frequency response analyzer, multiplied by the surface area of opposing electrodes ($cm^2$). This measurement is typically performed by applying a small (e.g., 5 mV) sinusoidal voltage to the cell and measuring the resulting current response. The resulting response can be described by in-phase and out-of-phase components. The in-phase (real or resistive) component of the impedance at 1 kHz is then multiplied by the surface area of opposing electrodes ($cm^2$) to give the area specific impedance. Area specific impedance can be used to determine the impedance at the anode or at the cathode.

In one aspect, the rechargeable battery is used in a battery system that operates as a microhybrid battery. Micro-hybrid batteries (or vehicles with start-stop feature) enable the vehicle's internal combustion engine to stop running when the vehicle is stationary, such as at a traffic light, saving fuel by up to 10%, above conventional vehicles. When the driver releases the brake to press the gas pedal, the engine quickly starts again before the vehicle moves forward. While the development of early generation micro-hybrids focused on smooth engine restarts, next generation systems are looking to recover braking energy as a path to even greater fuel economy. Existing lead acid micro-hybrid battery technology introduces some design constraints because it can't be charged very quickly and most of the vehicle's braking energy is still lost. Batteries with lithium-ion chemistries have a much higher rate of charge acceptance and therefore are positioned to support next generation micro-hybrid systems with higher rates of fuel economy improvement.

Microhybrid batteries can be used as starter batteries for car engines. Their proximity to the engine and location under the hood often does not allow space for bulky thermal management circuitry. Thus, the battery needs to be able to start the engine at cold, ambient temperatures, down to −30° C., without heat input. Additionally, the battery needs to be able to work for extended periods of time under the temperatures of a working car engine (up to 60° C.) without external cooling. Traditional lithium ion batteries suffer from high impedance at low temperatures, which reduces their ability to start an engine. Additionally, designs for increasing power at low temperature in lithium ion batteries often result in short life at high temperature. Although lead acid batteries have improved cold cranking capabilities, they suffer from short lifespans as opposed to lithium ion batteries for start-stop applications.

The nonaqueous electrolyte solution cell of the present disclosure has excellent low temperature characteristics and long-term stability, as well as excellent cycle characteristics when used in a microhybrid battery system. This technology enhances the success of lithium ion batteries in microhybrids, especially as starter batteries, because it boosts the cold power of the battery allowing it to start the vehicle's engine even in worst case cold temperatures. Additionally, the extended life of the battery at high temperature environments is significant because a common package location for starter batteries is the engine compartment where temperatures are usually higher than ambient during vehicle operation. Further, the nonaqueous electrolyte solution of the cell of the present disclosure has low gassing over the temperature range.

The present application will be explained in more detail with reference to the following examples. Materials, amounts of uses, ratios, operations and so forth described hereinafter may be altered without departing from the spirit of the present invention. The scope of the present invention, therefore, is not limited to specific examples described below. The disclosed electrolyte formulation is applicable to any form of battery, e.g. prismatic, button cell, can, pouch, etc.

An example of an electrolyte formulation is provided below. The electrolyte formulation provides low gassing over a wide range of temperatures. The reduced gassing wide temperature electrolyte formulation is one example of an electrolyte as described in the current application.

EXAMPLE 1

Electrolyte Formulation

An example electrolyte formulation according to the current disclosure comprises $LiPF_6$ at 1.0 M, LiTFSI at 0.15M, EC at 40 vol. %, EMC at 45 vol. %, DEC, at 10 vol. %, PC at 5 vol. %, ES at 1.5 wt. %, VC at 1 wt. % and PS at 1.5 wt. %.

The electrolyte formulation is compared to control electrolyte formulations, as discussed below and in FIGS. 1 through 10. The electrolyte formulation shows improved properties during low temperature and high temperature tests over the control electrolyte formulations.

A first control electrolyte formulation comprises $LiPF_6$ at 1.15M, EC at 30 vol. %, EMC at 55 vol. %, DEC at 10 vol. %, PC at 5 vol. %, ES at 1 wt. %, and VC at 2 wt. %. The first control electrolyte formulation includes a first additive containing a sulfonyl group, ES, but does not provide the salt solution or anti-gas additive of the current application.

A second control electrolyte formulation comprises $LiPF_6$ at 1.15M, EC at 35 vol. %, EMC at 40 vol. %, DMC at 20 vol. %, PC at 5 vol. % VC at 2.5 wt. %, tri-phenyl phosphite (TPPI) at 0.2 wt. %, and PS at 2 wt. %. The second control electrolyte formulation includes PS but does not provide a first additive containing a sulfonyl group or the salt system.

The above example electrolyte and control electrolyte formulations may be referred to in the following FIG. descriptions. The cells may be constructed using lithium iron phosphate (LFP) cathodes with graphite anodes or nickel cobalt metal (NCM) cathodes with graphite anodes. Other cathode/anode combinations may be possible.

Turning to FIG. 1, an initial capacity loss is shown for formation and qualification of a cell with a lithium iron phosphate (LFP) cathode and a graphite anode. A LFP/Graphite cell was prepared with the electrolyte formulation described in example 1 and another LFP/Graphite cell was prepared with the first control electrolyte formulation. The initial capacity loss for the new reduced gassing electrolyte during formation 101 and qualification 102 shows an improved initial capacity loss as compared to the first control electrolyte formulation at formation 103 and qualification 104.

Turning to FIG. 2, an initial capacity loss is shown for formation and qualification of a cell with a nickel-cobalt-manganese (NCM) cathode and graphite anode. An NCM/Graphite cell was prepared with the electrolyte formulation as described in example 1 and another NCM/Graphite cell was prepared with the second control electrolyte formulation. The initial capacity loss for the new reduced gassing electrolyte 201 shows an improved initial capacity loss as compared to the second control electrolyte formulation 202.

Thus, the initial capacity loss data, as illustrated in FIGS. 1 and 2 illustrates that the new electrolyte formulation provides better initial capacity loss as compared to the first and second control electrolyte formulations under various testing conditions.

Figure 3:
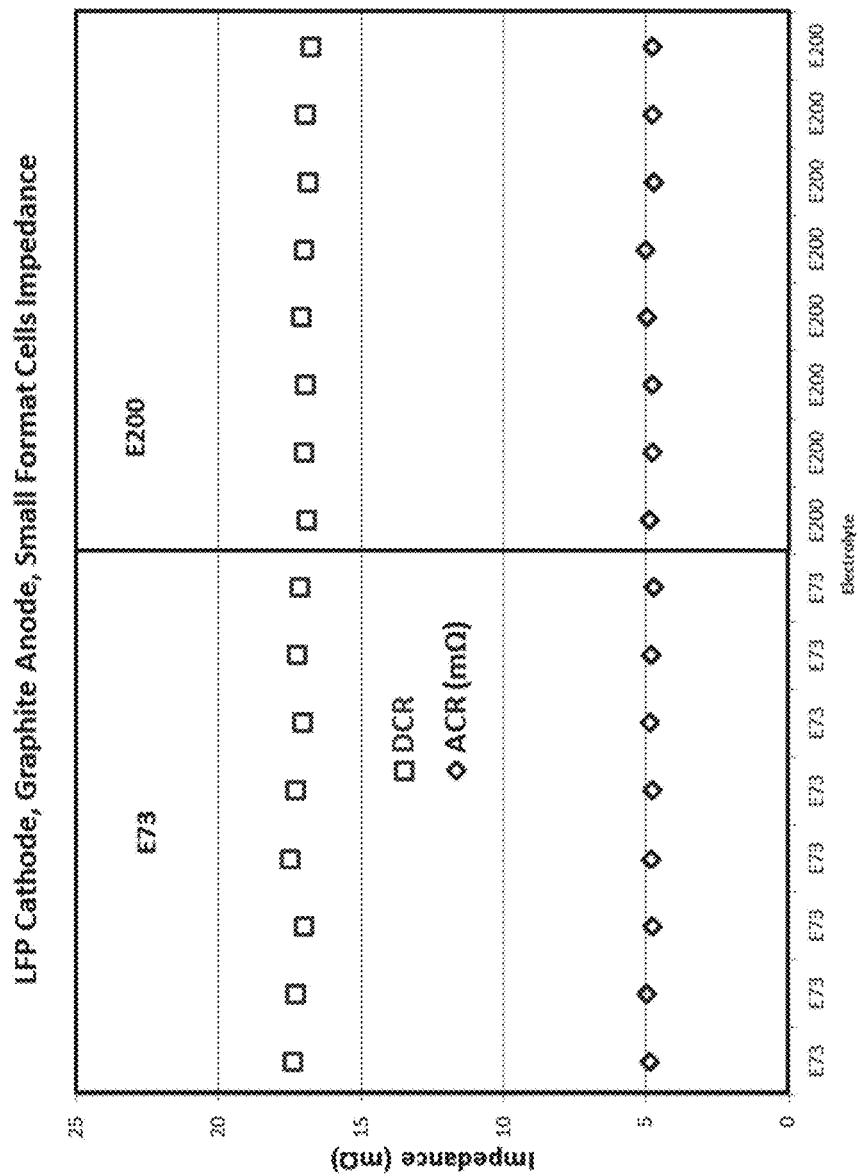
FIG. 3 illustrates the impedance of the electrolyte formulation in an LFP/Graphite cell compared to control electrolytes.

Turning to FIG. 3, an alternating current resistance/direct current resistance (ACR/DCR) impedance parity is illustrated between the new electrolyte formulation and the second control electrolyte formulations in LFP/Graphite cells. The new electrolyte formulation shows similar or lower impedance measurements for both the DCR (squares) and ACR (diamonds) as compared to the first control electrolyte.

Figure 4:
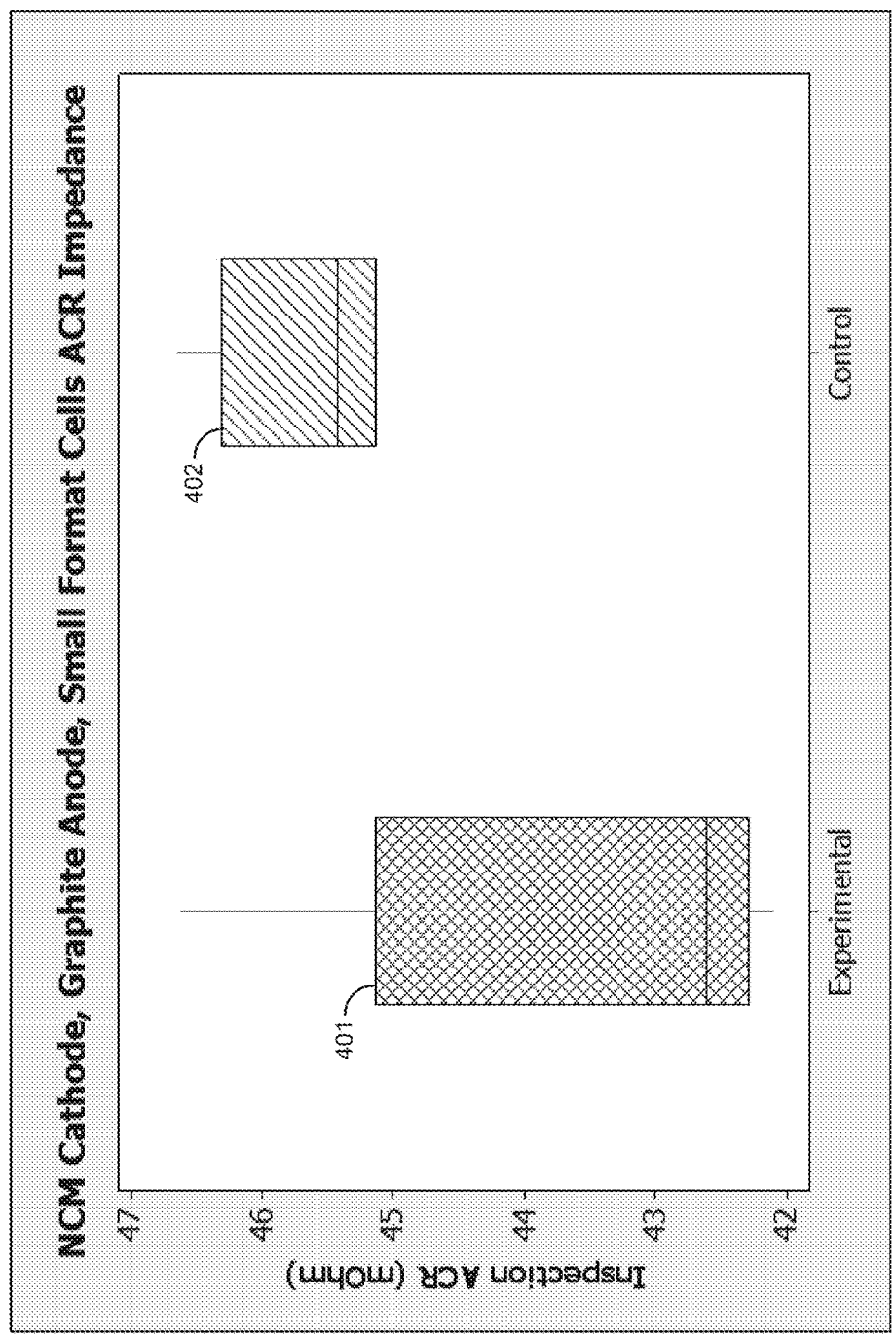
FIG. 4 illustrates the impedance of the electrolyte formulation in an NCM/Graphite cell compared to control electrolytes.

Turning to FIG. 4, an ACR impedance for cells with the electrolyte in example 1 is illustrated. Compared to the second control electrolyte 402 for cells with NCM cathodes and graphite anodes, the new electrolyte formulation 401 shows an improved ACR impedance in NCM/graphite cells.

Thus, the new electrolyte formulation maintains/reduces impedance, as illustrated in FIGS. 3 and 4.

Figure 5A:
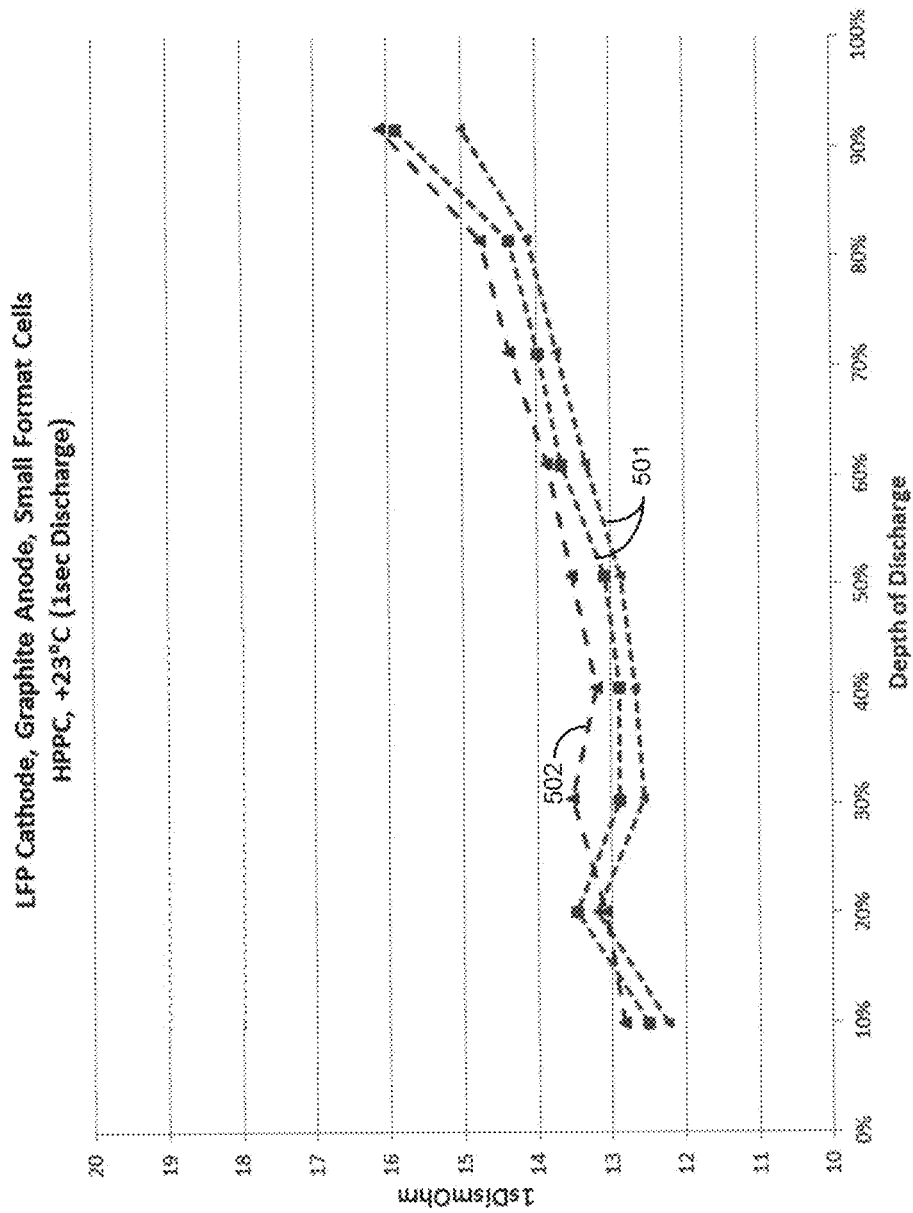
FIG. 5A illustrates the hybrid pulse power capability (HPPC) at 23° C. of the electrolyte formulation in an LFP/Graphite cell at 1 second pulse power compared to control electrolytes.
Figure 5B:
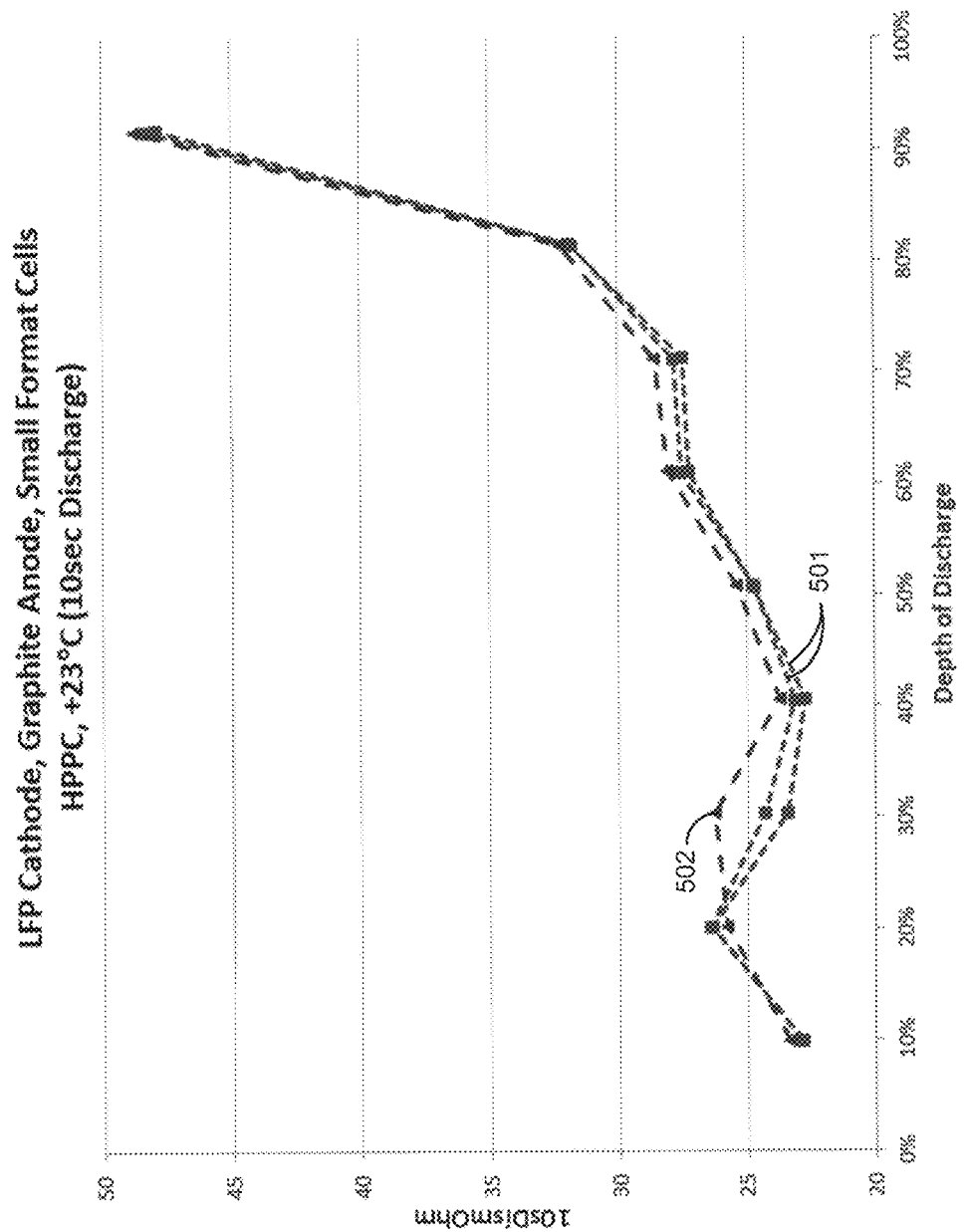
FIG. 5B illustrates the hybrid pulse power capability (HPPC) at 23° C. of the electrolyte formulation in an LFP/Graphite cell at 10 second pulse power compared to control electrolytes.

Turning to FIGS. 5A and 5B, a hybrid pulse power capability (HPPC) test is illustrated at 23° C. for a 1 second pulse power, in FIG. 5A, and a 10 second pulse power, in FIG. 5B. The new electrolyte formulation, 501, shows a decrease in DCR during the HPPC test as compared to the first control electrolyte formulation 502. All electrolytes were used in an LFP/Graphite cell.

Figure 6B:
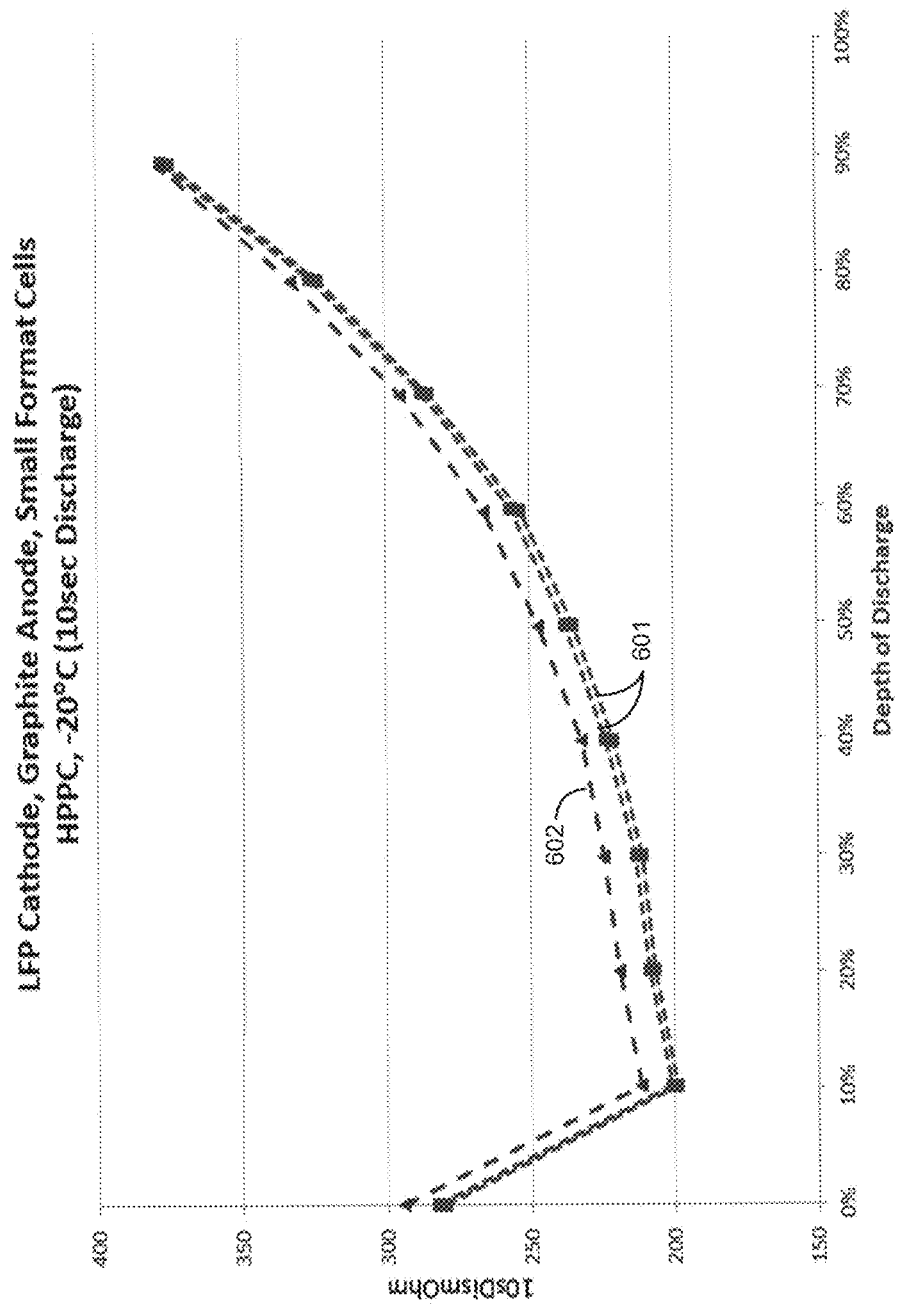
FIG. 6B illustrates the hybrid pulse power capability (HPPC) at −20° C. of the electrolyte formulation in an LFP/Graphite cell, at 10 second pulse power compared to control electrolytes.

Turning to FIGS. 6A and 6B, a hybrid pulse power capability (HPPC) test is illustrated at −20° C. for a 1 second pulse power, in FIG. 6A, and a 10 second pulse power, in FIG. 6B. The new electrolyte formulation, 601, shows a significant decrease in DCR during the HPPC test as compared to the first control electrolyte formulation, 602. Thus, the new electrolyte formulation shows improved performance at low temperatures. All electrolytes were used in an LFP/Graphite cell.

Figure 7:
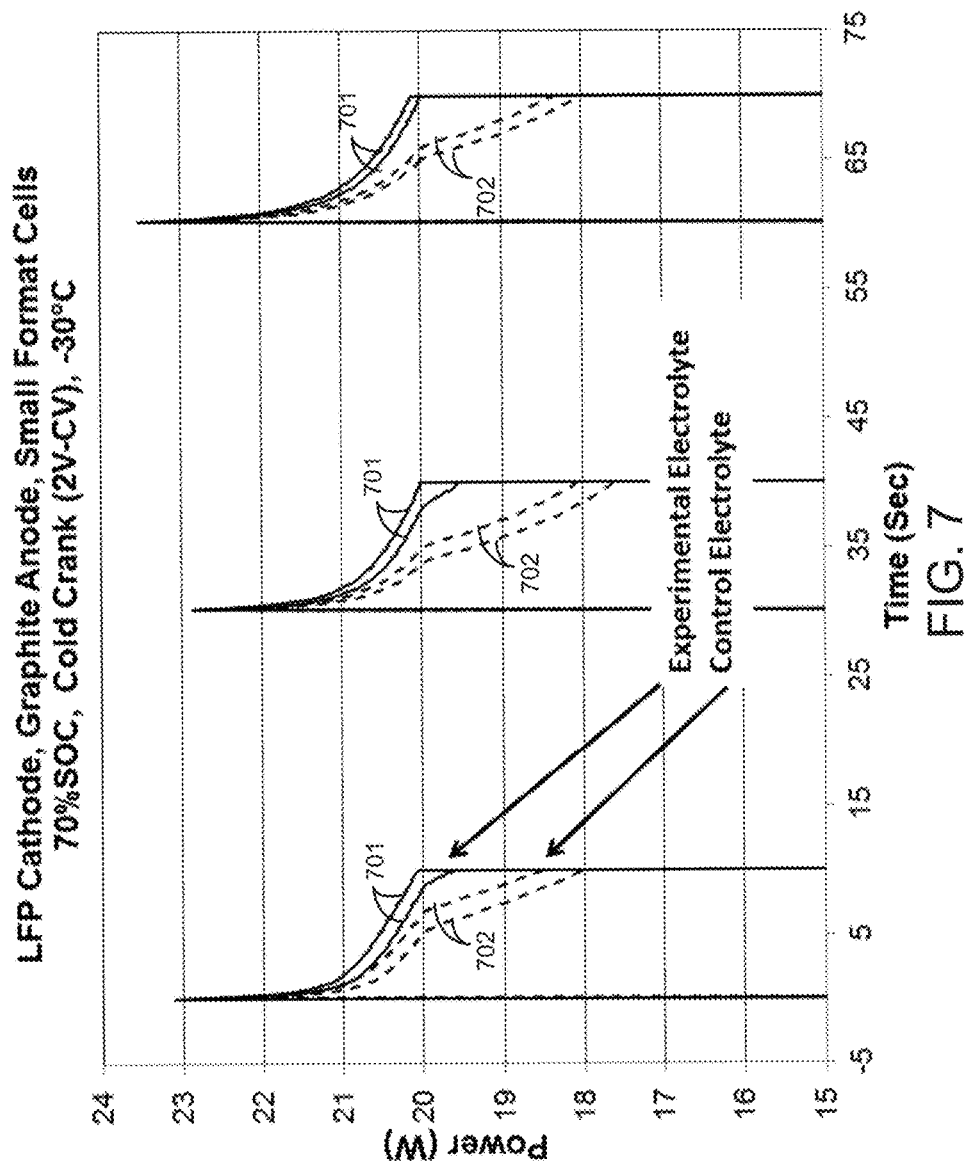
FIG. 7 illustrates the power resulting from a cold crank test at −30° C. with the electrolyte formulation in LFP/Graphite cells as compared to control electrolytes.

Turning to FIG. 7, the power at 70% state of charge (SOC) during cold cranking at −30° C. is illustrated. The new electrolyte formulation 701 (solid lines), highlighted with upper arrow, shows increased power as compared to the first control electrolyte formulation 702 (dashed lines), highlighted with lower arrow. Thus, the new electrolyte formulation shows improved performance at low temperatures.

Figure 8:
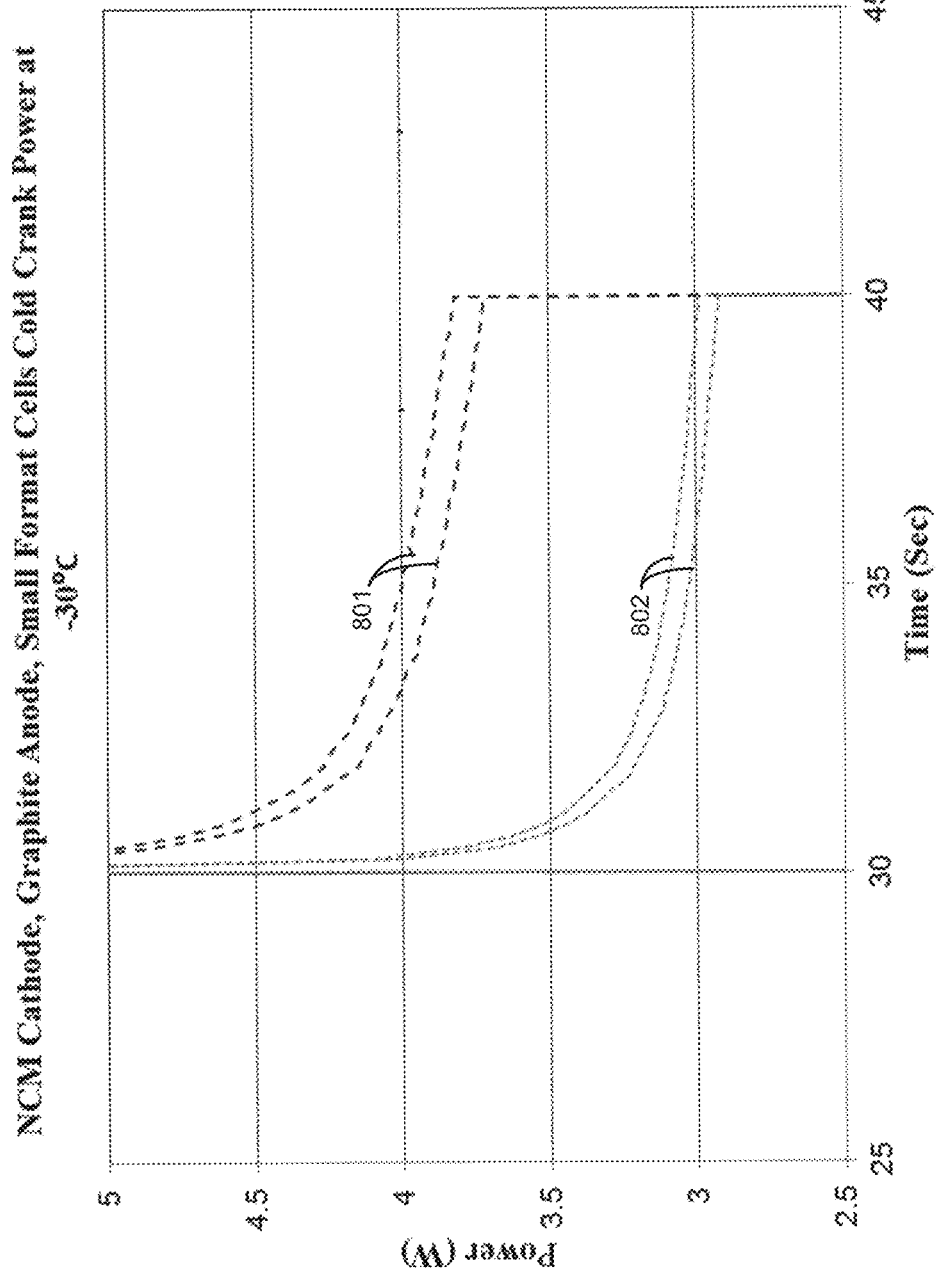
FIG. 8 illustrates the power resulting from a cold crank test at −30° C. for NCM/Graphite Cells with electrolyte formulation compared to control electrolytes.

Turning to FIG. 8, the power during cold crank at −30° C. for NCM/Graphite cells is illustrated. The new electrolyte formulation 801 shows about a 20% increase in power at cold crank as compared to the second control electrolyte formulation 802. Thus, the new electrolyte formulation shows improved performance at low temperatures.

Figure 9:
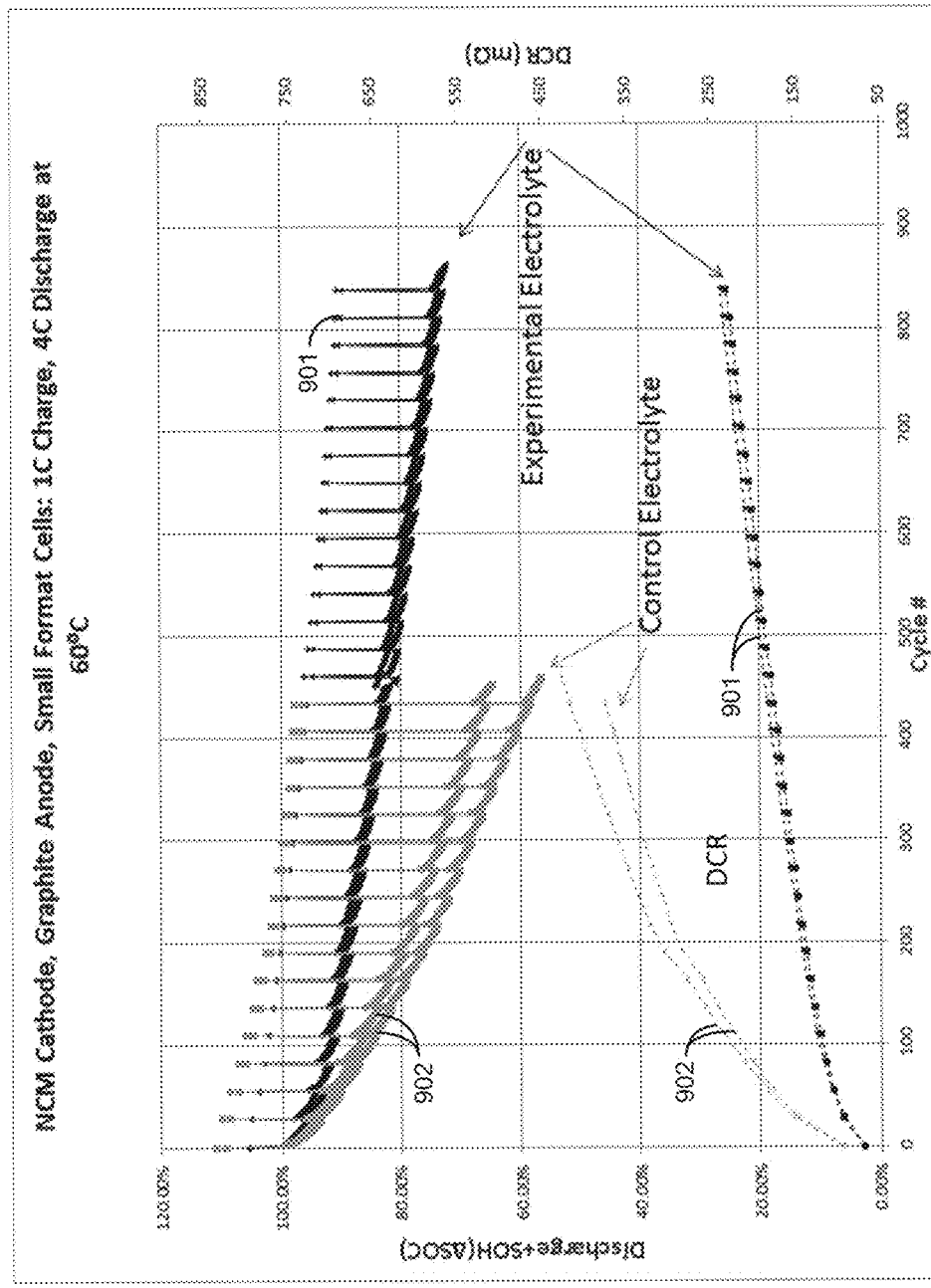
FIG. 9 illustrates the high temperature cycle life test results for NCM/Graphite cells with the electrolyte formulation compared to control electrolytes.

Turning to FIG. 9, the cycle life of NCM cathode/graphite anode cells is illustrated. The new electrolyte, black lines 901, shows an improved cycle life as compared to the second control electrolyte, gray lines 902. Thus, the new electrolyte formulation may extend the cycle life.

Figure 10:
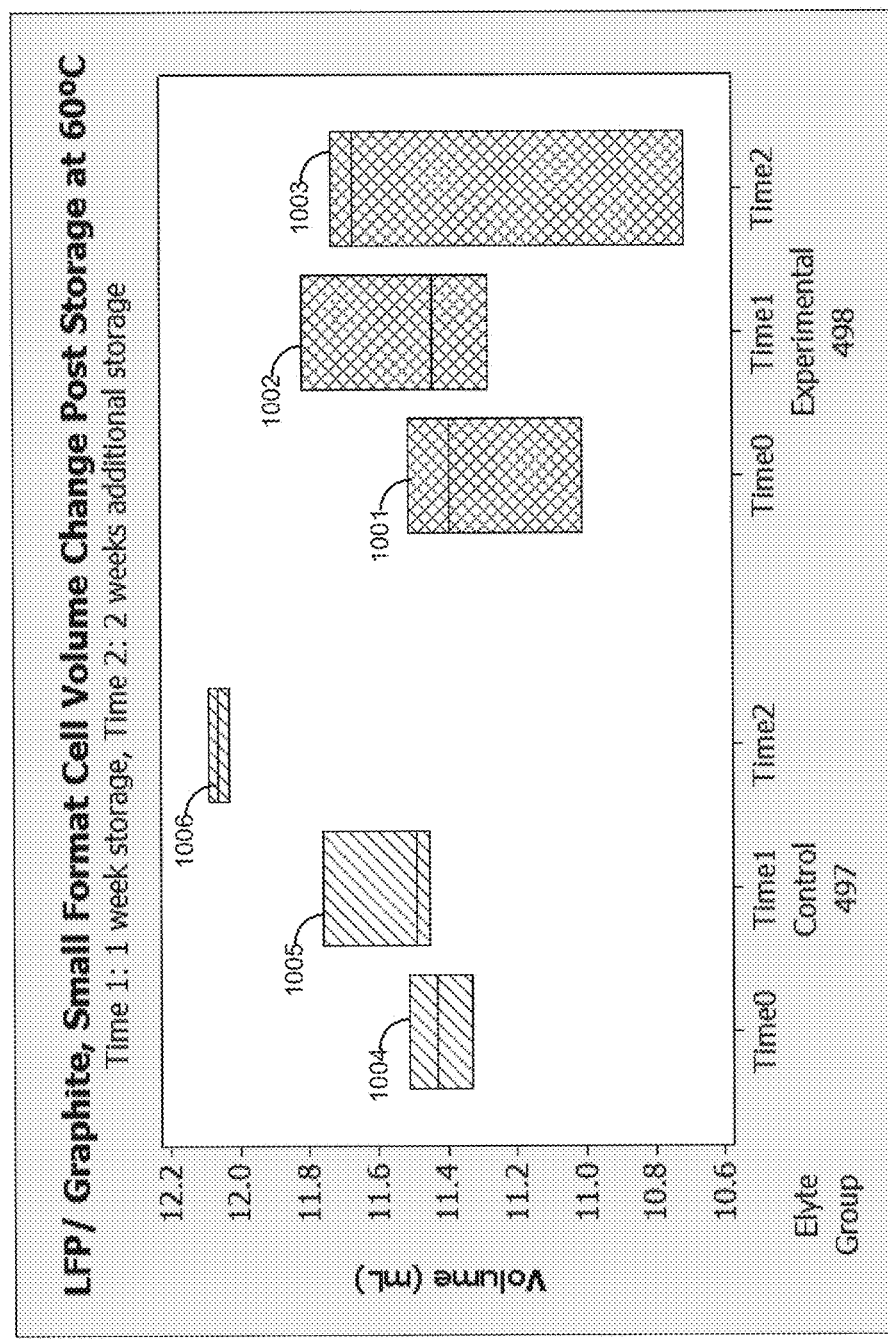
FIG. 10 illustrates the change in volume during 55° C. storage of LFP/Graphite cells with the electrolyte formulation compared to control electrolytes.

Turning to FIG. 10, the gas volume following storage at 55° C. is illustrated in LFP/Graphite Cells. The new electrolyte formulation 1001, 1002, 1003 provides a gassing level which is in line with other acceptable electrolytes over times Time0, Time1, and Time2, for use in pouch constructions, such as the second control electrolyte formulation 1004, 1005, 1006. Thus, the new electrolyte formulation provides low gassing.

The disclosed electrolyte formulation includes an additive system and salt system which provides a low gassing, wide temperature cycling system. In one example, the disclosed formulation comprises a nonaqueous electrolytic solution including a sulfonyl group, an anti-gassing agent, a second additive, and a salt system. The anti-gassing agent may reduce gassing of the additive containing a sulfonyl group while the salt system including a co-salt may reduce the amount of $LiPF_6$ and wherein the co-salt will be unlikely to generate Lewis acidic decomposition products. Further, in some examples, a second additive, such as FEC, may be used to reduce impedance and strengthen the SEI layer.

As briefly mentioned above, the new electrolyte formulation may be used in a number of different types of battery construction, including in a pouch construction. For example, the anti-gassing properties of the disclosed formulation may specifically improve use in a pouch.

Figure 11:
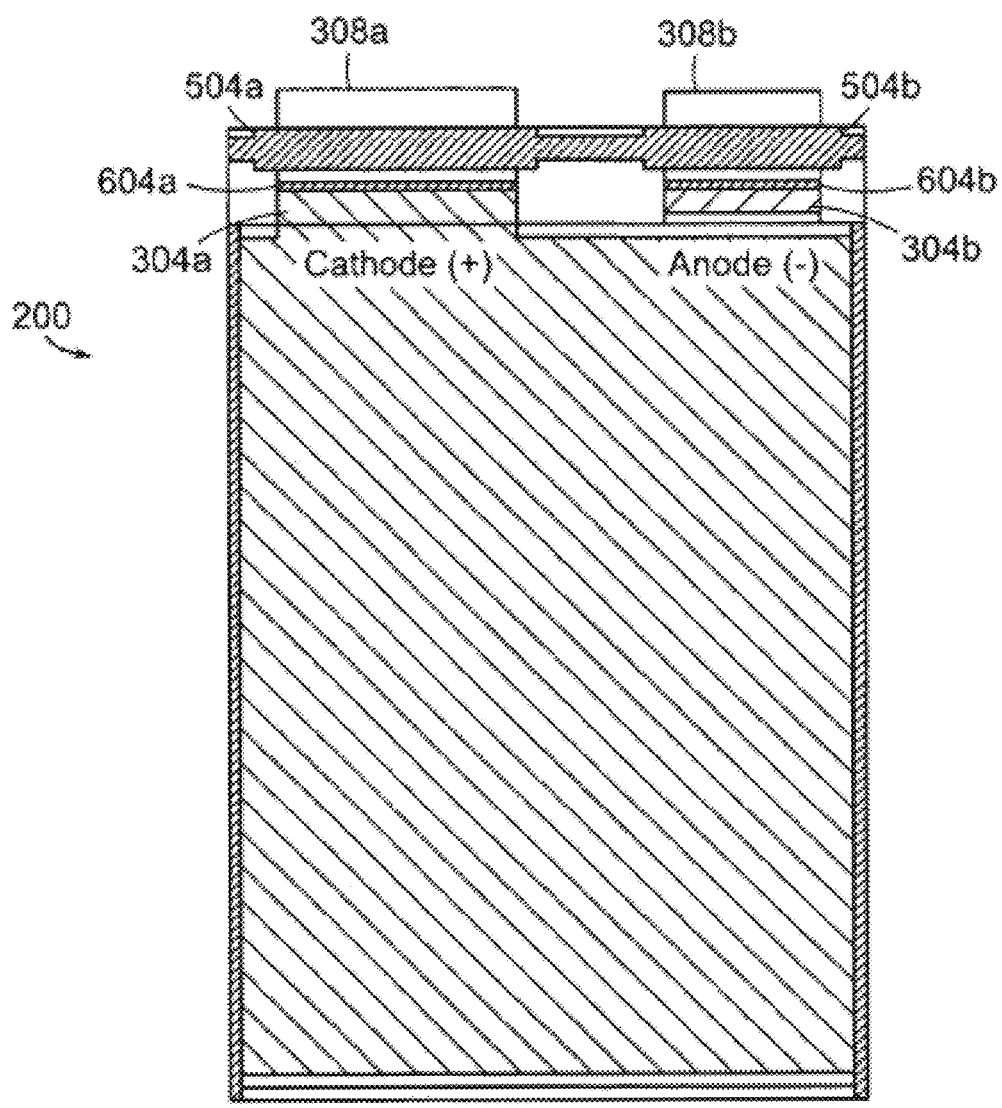
FIG. 11 illustrates an exemplary pouch construction for use with the electrolyte formulation.

An exemplary pouch construction for use with the disclosed electrolyte formulation is illustrated for reference in FIG. 11. The pouch encloses positive and negative electrode sheets and is sealed around the positive and negative electrodes. For example, the pouch material may comprise laminated layers comprising at least one of polyethylene, nylon, and aluminum foil. In one example, the inner components may be hermetically sealed within an enclosure made of the pouch materials. Other suitable materials may be used to seal the inner components of the cell.

The diagram in FIG. 11 shows various components of one example of a complete prismatic battery cell 200 including collecting tabs 304a, 304b, extension tabs 308a, 308b, welding section 604a, 604b, and strips 504a, 504b. A pouch construction may be susceptible to rupture when high gas generation is present within the cell. Use of the disclosed electrolyte formulation in the pouch provides reduced gassing, improved/maintained impedance, improved cold cranking power, and use over a wide temperature range.

The foregoing discussion should be understood as illustrative and should not be considered limiting in any sense. While the inventions have been particularly shown and described with references to preferred embodiments thereof, it will be understood by those skilled in the art that various changes in form and details may be made therein without departing from the spirit and scope of the inventions as defined by the claims.

The corresponding structures, materials, acts and equivalents of all means or steps plus function elements in the claims below are intended to include any structure, material or acts for performing the functions in combination with other claimed elements as specifically claimed.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. A rechargeable battery comprising:
a negative electrode capable of intercalating and liberating lithium;
a positive electrode comprising a lithium transition metal oxoanion electroactive material;
a separator;
a nonaqueous electrolyte solution comprising:
a salt system, wherein the salt system comprises one or more lithium salts selected from LiPF$_6$, LiClO$_4$, LiBF$_4$, LiCF$_3$SO$_3$, LiN(CF$_3$SO$_2$)$_2$, LiN(CF$_3$CF$_2$SO$_2$)$_2$, LiN(CFSO$_2$)(C$_4$F$_9$SO$_2$), and LiC(CF$_3$SO$_2$)$_2$; and
one or more co-salts selected from one or more of bis(trifluoromethane)sulfonamide lithium, lithium bis pentafluoroethanesulfonyl imide, lithium trifluoromethanesulfonate, lithium bisoxalatoborate, and lithium difluorooxalateborate, wherein each of the one or more co-salts does not generate Lewis acidic decomposition products and is different than each of the one or more lithium salts;
an additive system comprising:
an anti-gassing agent,
at least one first additive, different than the anti-gassing agent, wherein the first additive contains a sulfonyl group represented by the formula (1):

R$_1$-A-R$_2$ (1)

in which, A represents the sulfonyl group, R$_1$ and R$_2$ independently represent an alkyl group which may be substituted with an aryl group or halogen atom; an aryl group which may be substituted with an alkyl group or halogen atom; or may be taken together to form, together with -A-, a cyclic structure which may contain an unsaturated bond,
wherein increasing an amount of the co-salt decreases an amount of the first additive, and where a concentration of the first additive is between 0.1 to 5 wt. % and where a concentration of the co-salt is between 0.05 to 0.25 M;
where "A" is represented by a formula selected from the group comprising:

(3)

at least one second additive, different than the anti-gassing agent, where the second additive is less than 5 wt. % fluoroethylene carbonate;
vinylene carbonate, wherein a ratio of the vinylene carbonate to the first additive is between 1:1 and 2:1;
wherein increasing the second additive decreases an amount of the vinylene carbonate, and where concentrations of the second additive and the vinylene carbonate are between 0.1 to 5 wt. %; and
at least one organic solvent, wherein the nonaqueous electrolyte solution is free of γ-butyrolactone.

2. The rechargeable battery of claim 1, wherein the first additive containing a sulfonyl group is present at 0.1 wt. % to 5 wt. % of the electrolyte solution.

3. The rechargeable battery of claim 1, wherein the anti-gassing agent is at least one of 1,5,2,4-dioxadithiane-2,2,3,3-tetraoxide (MMDS), prop-1-ene-1,3-sultone (PrS), or 1,3-propane sultone.

4. The rechargeable battery of claim 1, wherein the anti-gassing agent is present at less than or equal to 2 wt. %.

5. The rechargeable battery of claim 1, wherein the co-salt is present at 0.05M to 0.25 M.

6. The rechargeable battery of claim 1, wherein the lithium salt is present at 0.85 to 1.5M.

7. The rechargeable battery of claim 1, wherein the negative electrode comprises non-graphitizable carbon.

8. The rechargeable battery of claim 1, wherein the organic solvent comprises at least one of ethylene carbonate, propylene carbonate, butylene carbonate, dimethyl carbonate, diethyl carbonate and ethyl methyl carbonate, γ-valerolactone, methyl acetate and methyl propionate, tetrahydrofuran, 2-methyl tetrahydrofuran and tetrahydropyran, dimethoxyethane and dimethoxymethane, ethylene methyl phosphate and ethyl ethylene phosphate, trimethyl phosphate and triethy phosphate, halides thereof, vinyl ethylene carbonate (VEC) and fluoroethylenecarbonate (FEC), poly(ethylene glycol)diacrylate and combination thereof.

9. The rechargeable battery of claim 8, wherein the organic solvent comprises a mixture of ethylene carbonate, ethyl methyl carbonate, diethyl carbonate, and propylene carbonate.

10. The rechargeable battery of claim 1, wherein the battery is contained within a pouch.

11. The rechargeable battery of claim 1, wherein the negative electrode comprises non-graphitizable carbon, artificial graphite, and natural graphite combinations of carbonaceous materials with silicon or silicon oxide.

12. The rechargeable battery of claim 1, wherein the positive electrode comprises a lithium transition metal oxide.

13. A rechargeable battery comprising:
a negative electrode capable of intercalating and liberating lithium, wherein the negative electrode is graphite;
a positive electrode, wherein the positive electrode is lithium iron phosphate;
a separator;
a nonaqueous electrolyte solution comprising:
a salt system, wherein the salt system comprises one or more lithium salts selected from LiPF$_6$, LiClO$_4$, LiBF$_4$, LiCF$_3$SO$_3$, LiN(CF$_3$SO$_2$)$_2$, LiN(CF$_3$CF$_2$SO$_2$)$_2$, LiN(CFSO$_2$)(C$_4$F$_9$SO$_2$), and LiC(CF$_3$SO$_2$)$_2$; and
one or more co-salts selected from one or more of bis(trifluoromethane)sulfonamide lithium, lithium bis pentafluoroethanesulfonyl imide, lithium trifluoromethanesulfonate, lithium bisoxalatoborate, and lithium difluorooxalateborate, wherein each of the one or more co-salts does not generate Lewis acidic decomposition products and is different than each of the one or more lithium salts;
an anti-gassing agent, wherein the anti-gassing agent is 1,3-propane sultone;
at least one organic solvent, wherein the organic solvent is a mixture of ethylene carbonate, propylene carbonate, ethyl methyl carbonate, and diethyl carbonate, wherein the nonaqueous electrolyte solution is free of γ-butyrolactone and the organic solvent further comprises vinylene carbonate;
at least one first additive, different than the anti-gassing agent, containing a sulfonyl group wherein the at least one first additive is ethylene sulfite, wherein increasing an amount of the co-salt decreases an amount of the first additive, and where a concentration of the first additive is between 0.1 to 5 wt. % and where a concentration of the co-salt is between 0.05 to 0.25 M;

a second additive, different than the anti-gassing agent, wherein the second additive is fluoroethylene carbonate;

vinylene carbonate, wherein a ratio of the vinylene carbonate to the first additive is between 1:1 and 2:1; and wherein increasing the second additive decreases an amount of the vinylene carbonate, and where concentrations of the second additive and the vinylene carbonate are between 0.1 wt % to 5 wt. %.

14. The rechargeable battery of claim 13, wherein the organic solvent mixture includes 30 vol. % of ethylene carbonate, 55 vol. % of ethyl methyl carbonate, 10 vol. % of diethyl carbonate, and 5 vol. % of propylene carbonate.

15. The rechargeable battery of claim 13, wherein the lithium salt is present at 1.0M and wherein the co-salt is present within 0.1 to 0.2M.

16. An electrolyte formulation for a rechargeable battery comprising:

a salt system, wherein the salt system comprises one or more lithium salts selected from $LiPF_6$, $LiClO_4$, $LiBF_4$, $LiCF_3SO_3$, $LiN(CF_3SO_2)_2$, $LiN(CF_3CF_2SO_2)_2$, $LiN(CFSO_2)(C_4F_9SO_2)$, and $LiC(CF_3SO_2)_2$; and one or more co-salts selected from one or more of bis(trifluoromethane)sulfonamide lithium, lithium bis pentafluoroethanesulfonyl imide, lithium trifluoromethanesulfonate, lithium bisoxalatoborate, and lithium difluorooxalateborate, wherein each of the one or more co-salts does not generate Lewis acidic decomposition products and is different than each of the one or more lithium salts;

an additive system comprising:

at least one first additive, different than an anti-gassing agent, containing a sulfonyl group represented by the formula (1):

$$R_1\text{-}A\text{-}R_2 \qquad (1)$$

in which, A represents the sulfonyl group, $R_1$ and $R_2$ independently represent an alkyl group which may be substituted with an aryl group or halogen atom; an aryl group which may be substituted with an alkyl group or halogen atom; or may be taken together to form, together with -A-, a cyclic structure which may contain an unsaturated bond, wherein increasing an amount of the co-salt decreases an amount of the first additive, and where a concentration of the first additive is between 0.1 to 5 wt. % and where a concentration of the co-salt is between 0.05 to 0.25 M;

where "A" is represented by a formula selected from the group comprising:

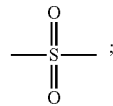

(3)

the anti-gassing agent;

a second additive, different than the anti-gassing agent, where the second additive is less than 5 wt. % fluoroethylene carbonate;

vinylene carbonate, wherein a ratio of the vinylene carbonate to the first additive is between 1:1 and 2:1; and wherein increasing the second additive decreases an amount of the vinylene carbonate, and where concentrations of the second additive and the vinylene carbonate are between 0.1 wt % to 5 wt. %.

17. The electrolyte formulation of claim 16, further comprising a solvent system.

* * * * *